Figure 1:
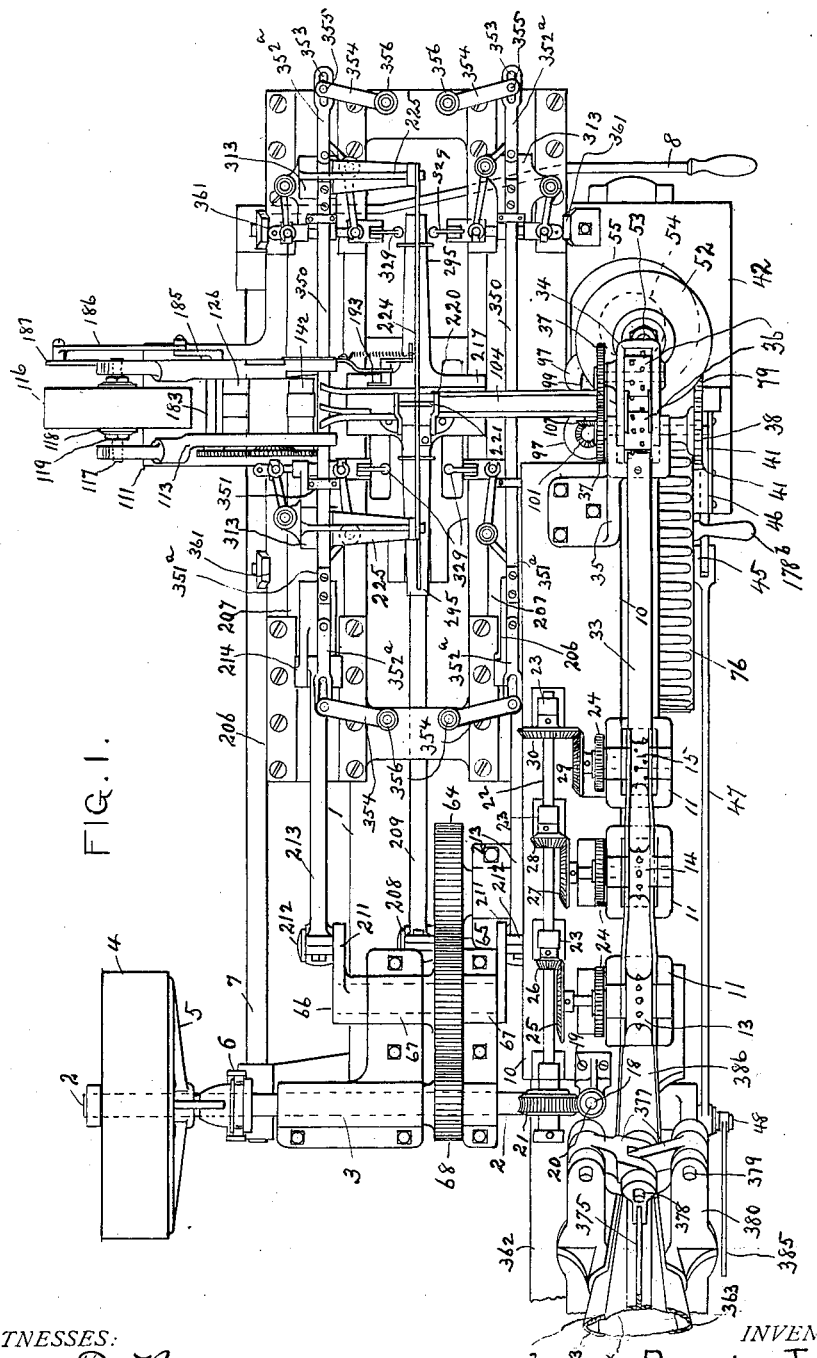

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 1.

WITNESSES:
William F. Bauer.
Irvine Miller.

INVENTOR.
Dennis T. Igou.
BY
ATTORNEY.

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 3.

WITNESSES:
William F. Bauer.
Irvine Miller.

INVENTOR.
Dennis T. Igou.
BY
ATTORNEY.

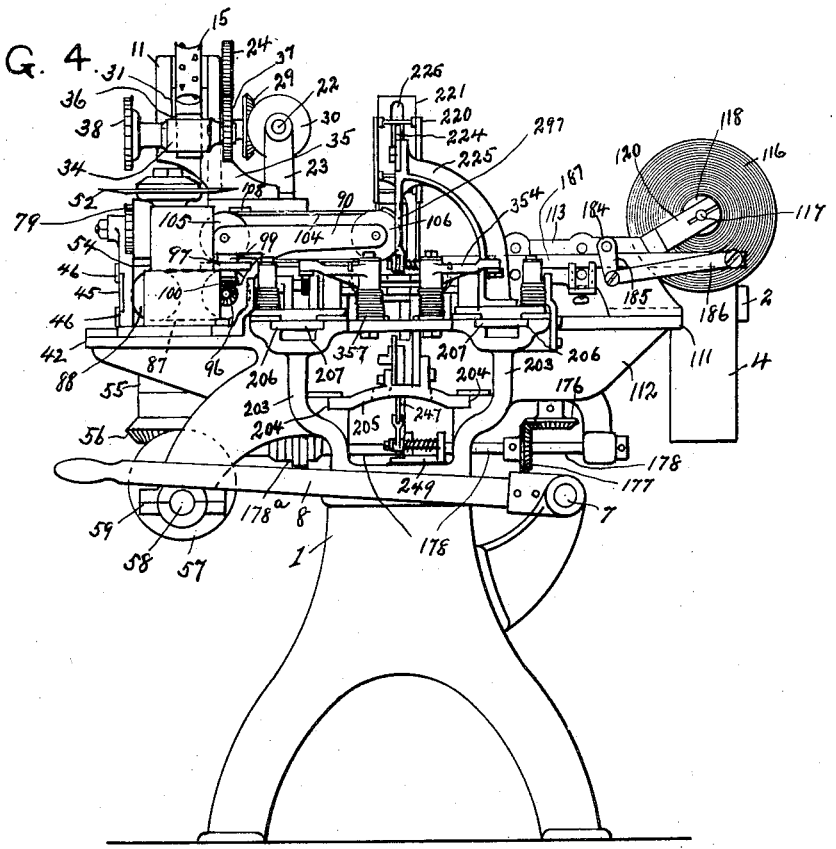
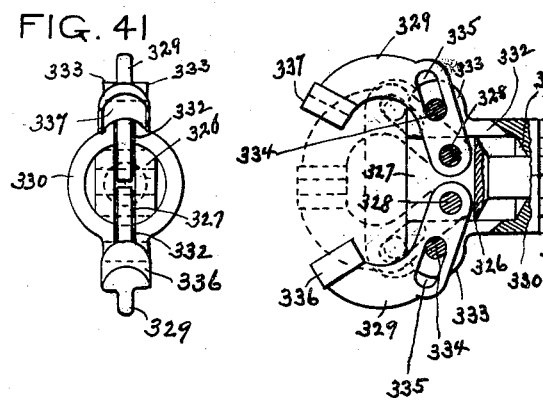
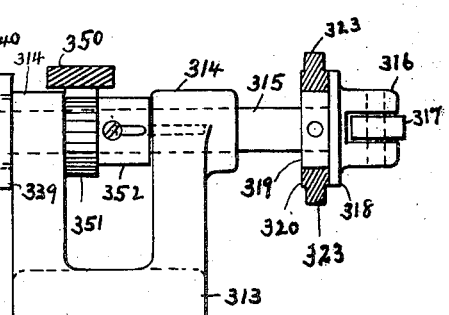

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 5.
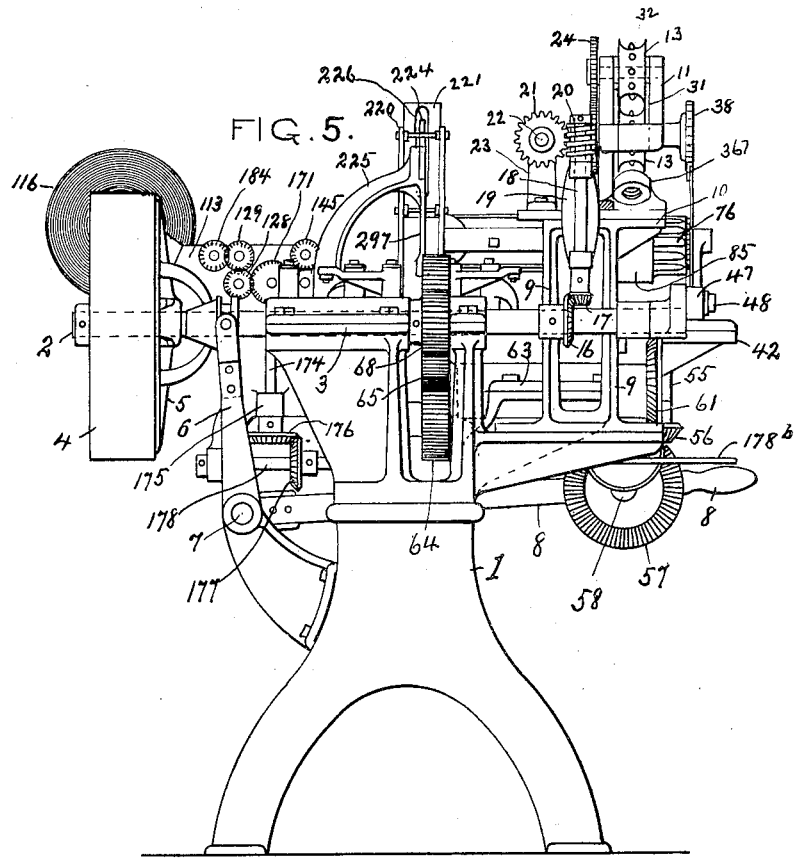
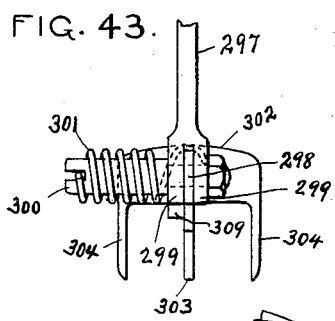
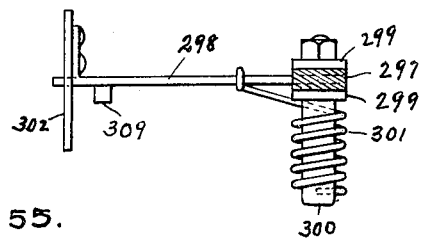
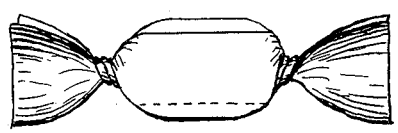
WITNESSES:
William F. Bauer
Irvine Miller
INVENTOR.
Dennis T. Igou.
BY H. A. Toulmin,
ATTORNEY.

No. 852,560.  
D. T. IGOU.  
PATENTED MAY 7, 1907.

MACHINE FOR FORMING AND WRAPPING CONFECTIONS AND OTHER ARTICLES.

APPLICATION FILED JAN. 26, 1906.

17 SHEETS—SHEET 6.

WITNESSES:  
William F. Bauer.  
Irvine Miller.

INVENTOR.  
Dennis T. Igou.  
BY H. A. Toulmin.  
ATTORNEY.

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 7.

WITNESSES:
William F. Bauer.
Sorrie Miller.

INVENTOR.
Dennis T. Igou.
BY
ATTORNEY.

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 8.
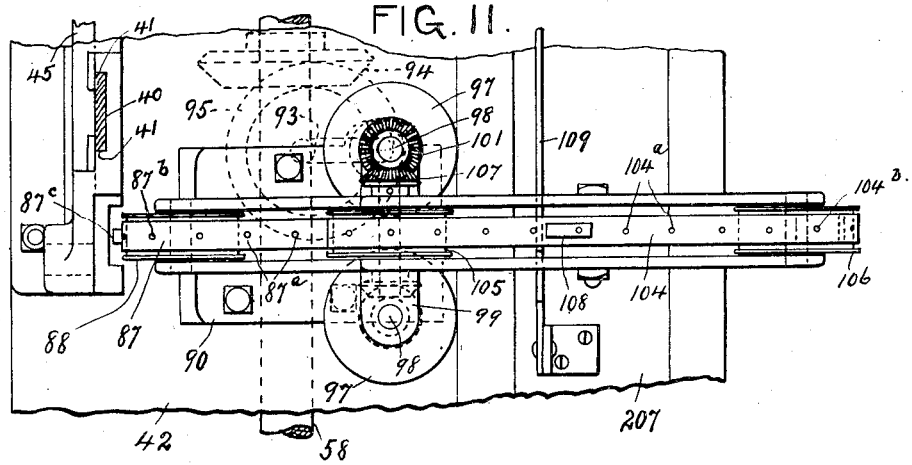
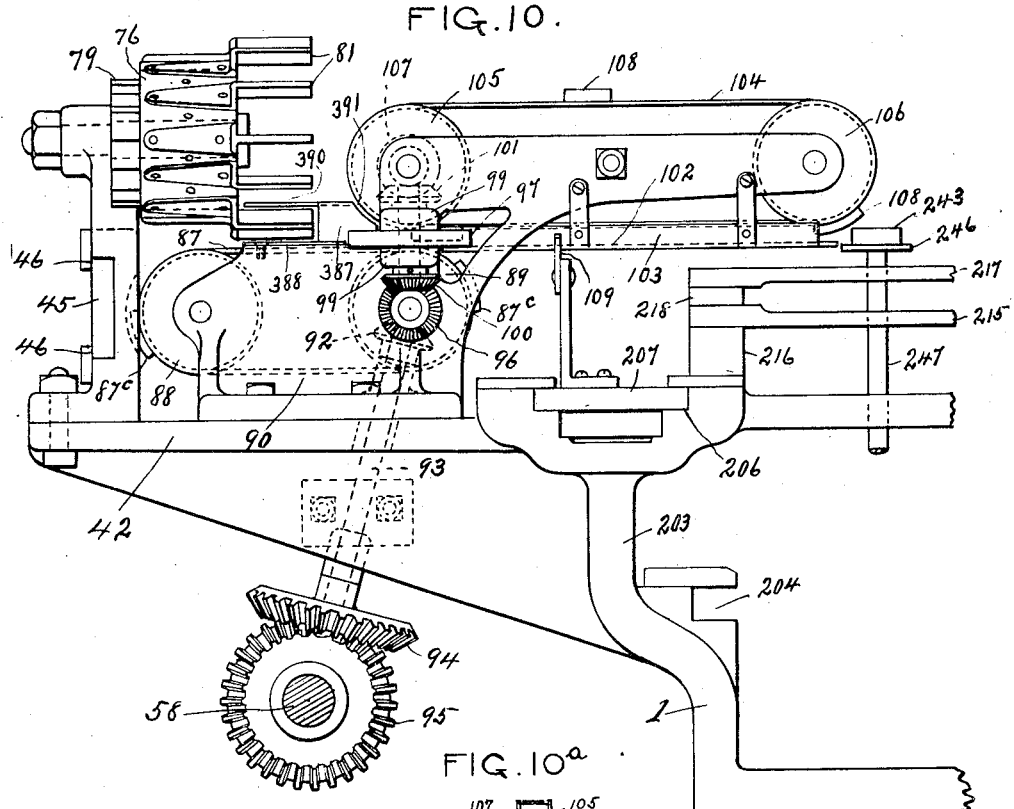
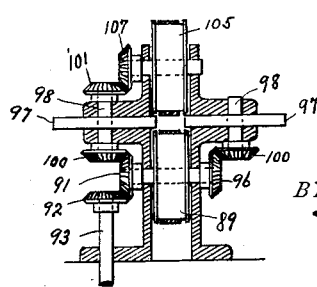
WITNESSES: William F. Bauer. Irvine Miller.
INVENTOR. Dennis T. Igou.
BY H. A. Toulmin, ATTORNEY.

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 9.
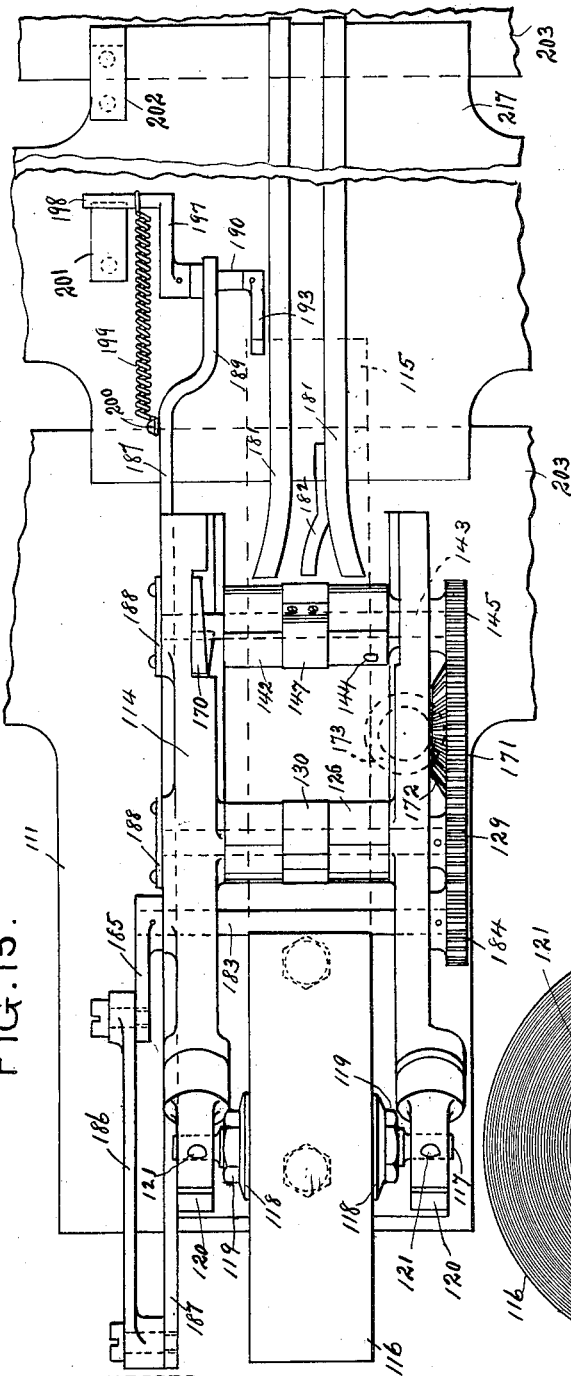
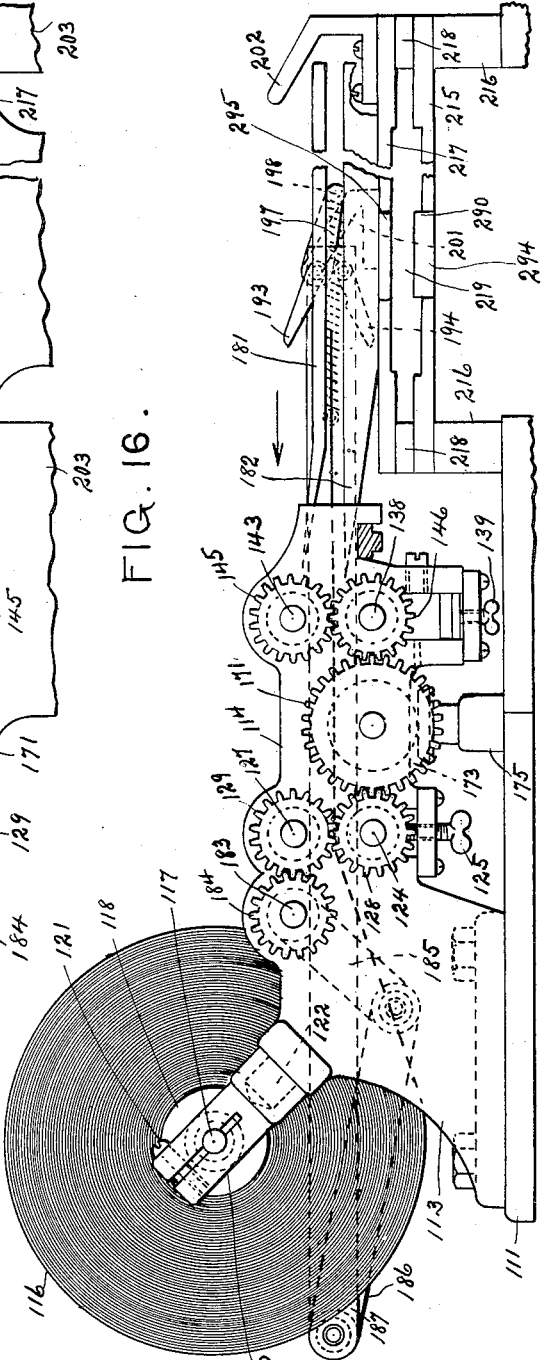
WITNESSES:
William F Bauer.
Irvine Miller.
INVENTOR.
Dennis T Igou.
BY
ATTORNEY.

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 10.
FIG. 17.
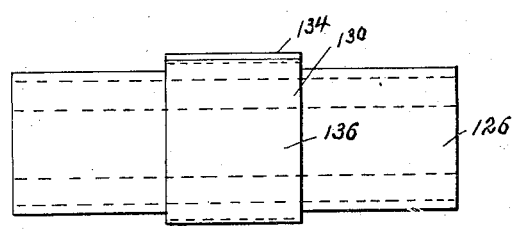
FIG. 18.
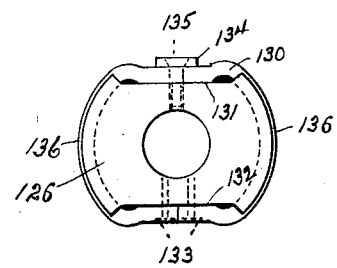
FIG. 19.
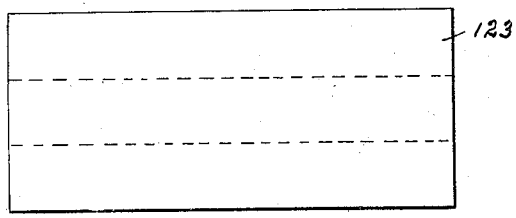
FIG. 20.
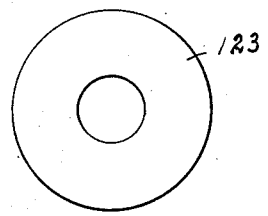
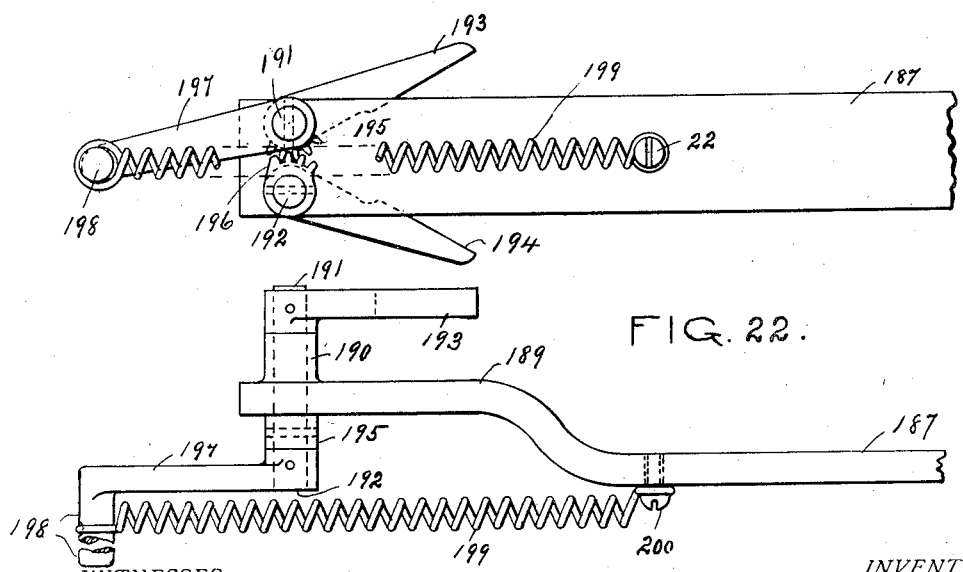
WITNESSES:
William F. Bauer
Irvine Miller
INVENTOR.
Dennis T. Igou.
BY H. A. Toulmin,
ATTORNEY.

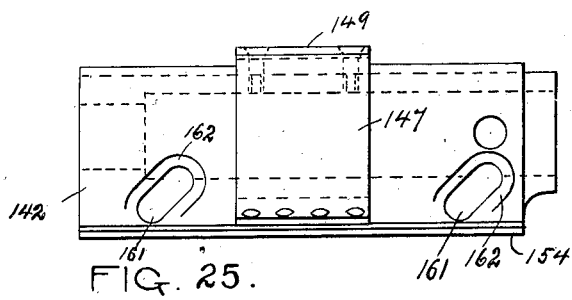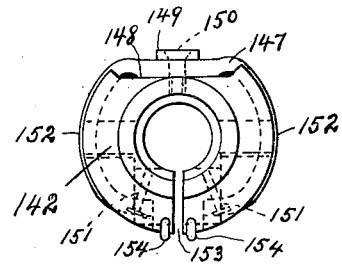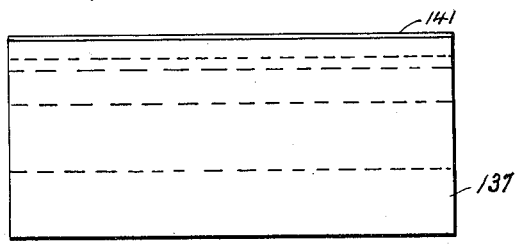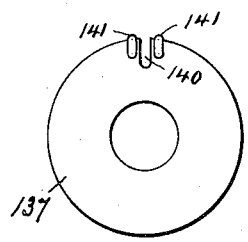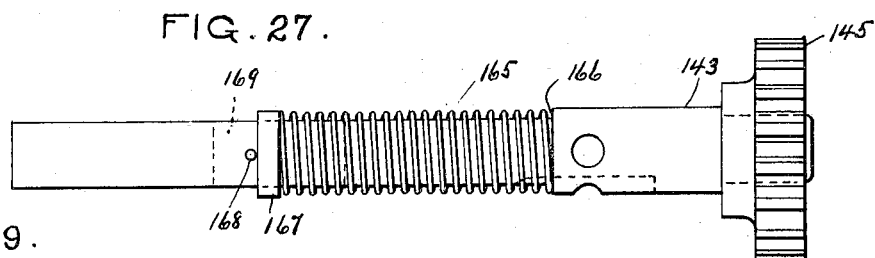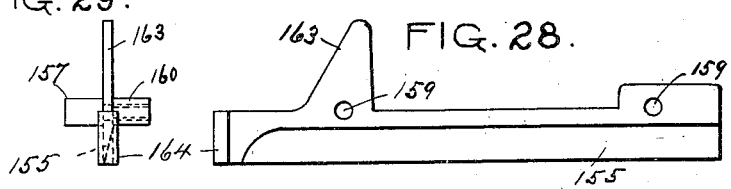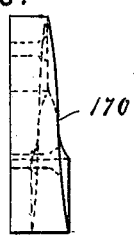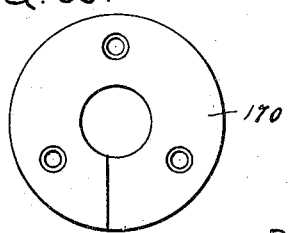

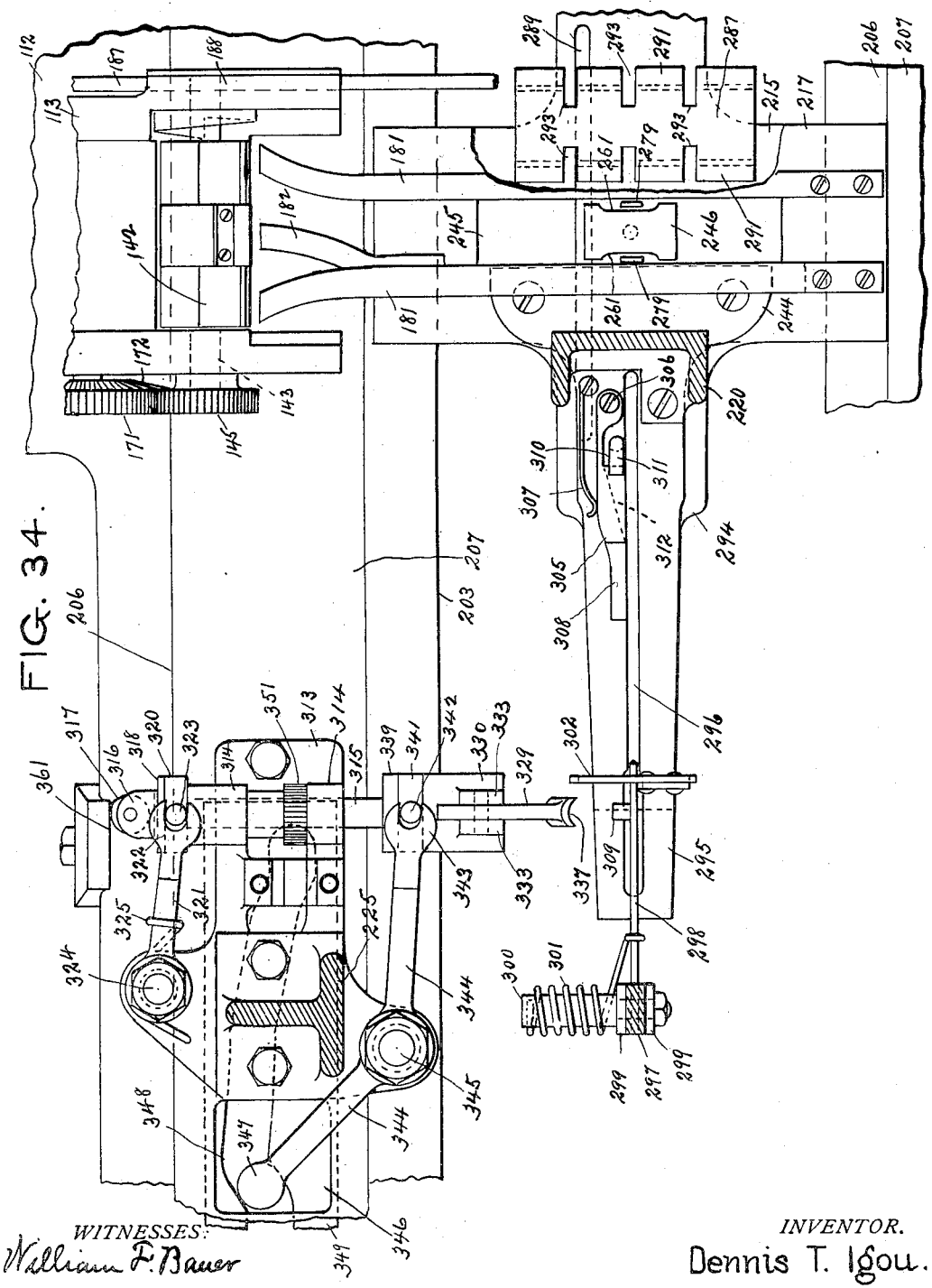

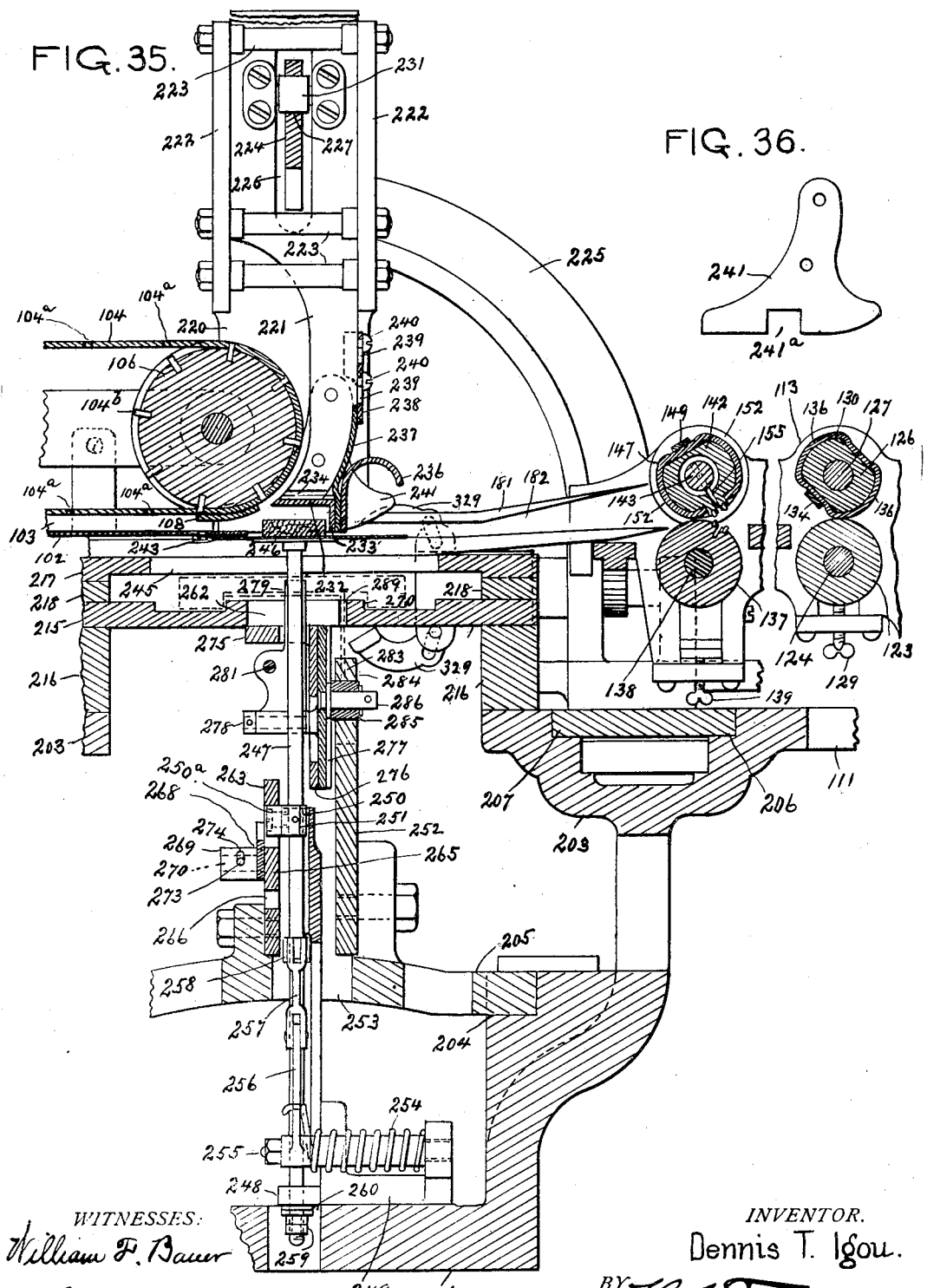

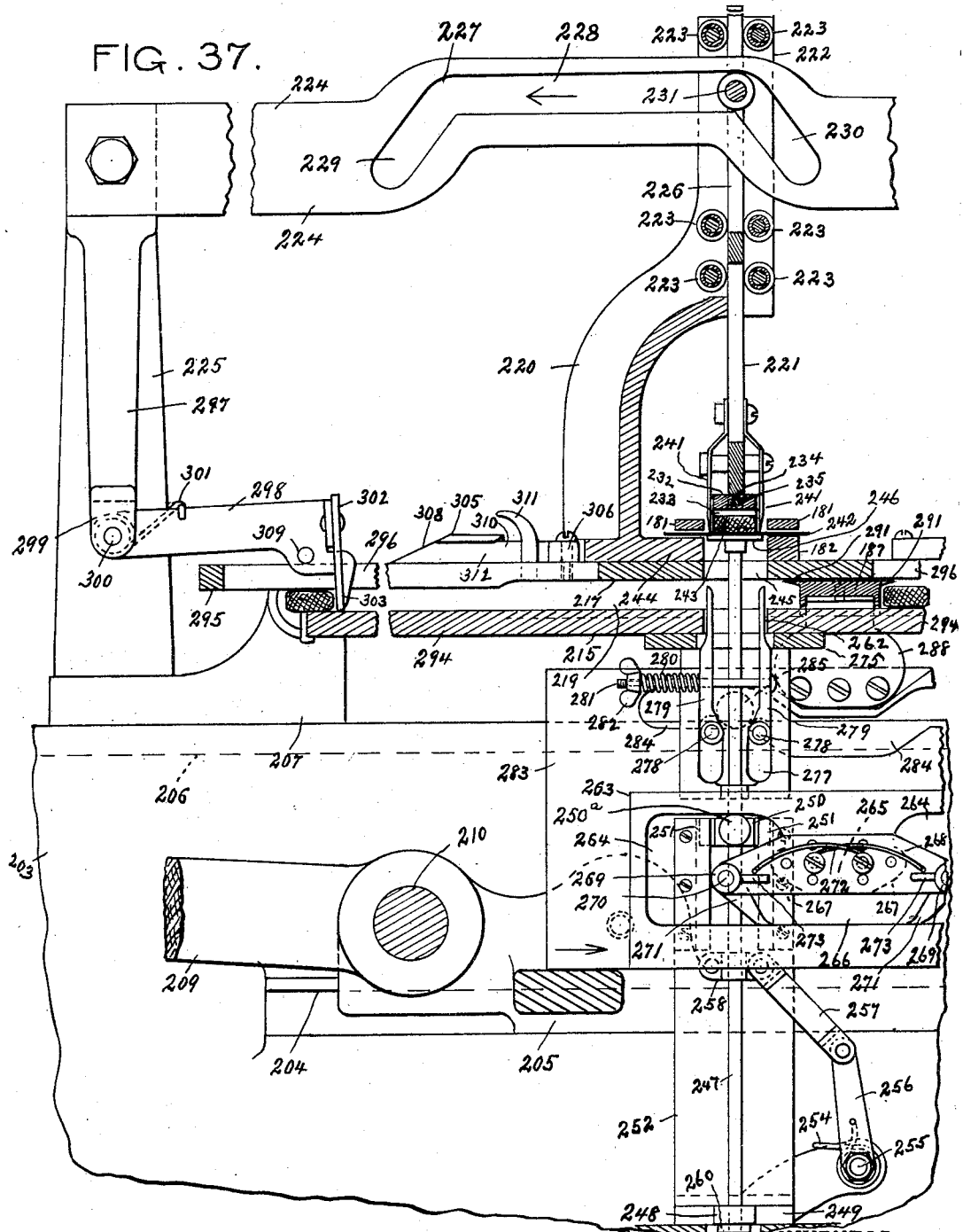

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 15.

WITNESSES:
William F. Bauer
Irvine Miller

INVENTOR.
Dennis T. Igou.
BY H. A. Toulmin,
ATTORNEY.

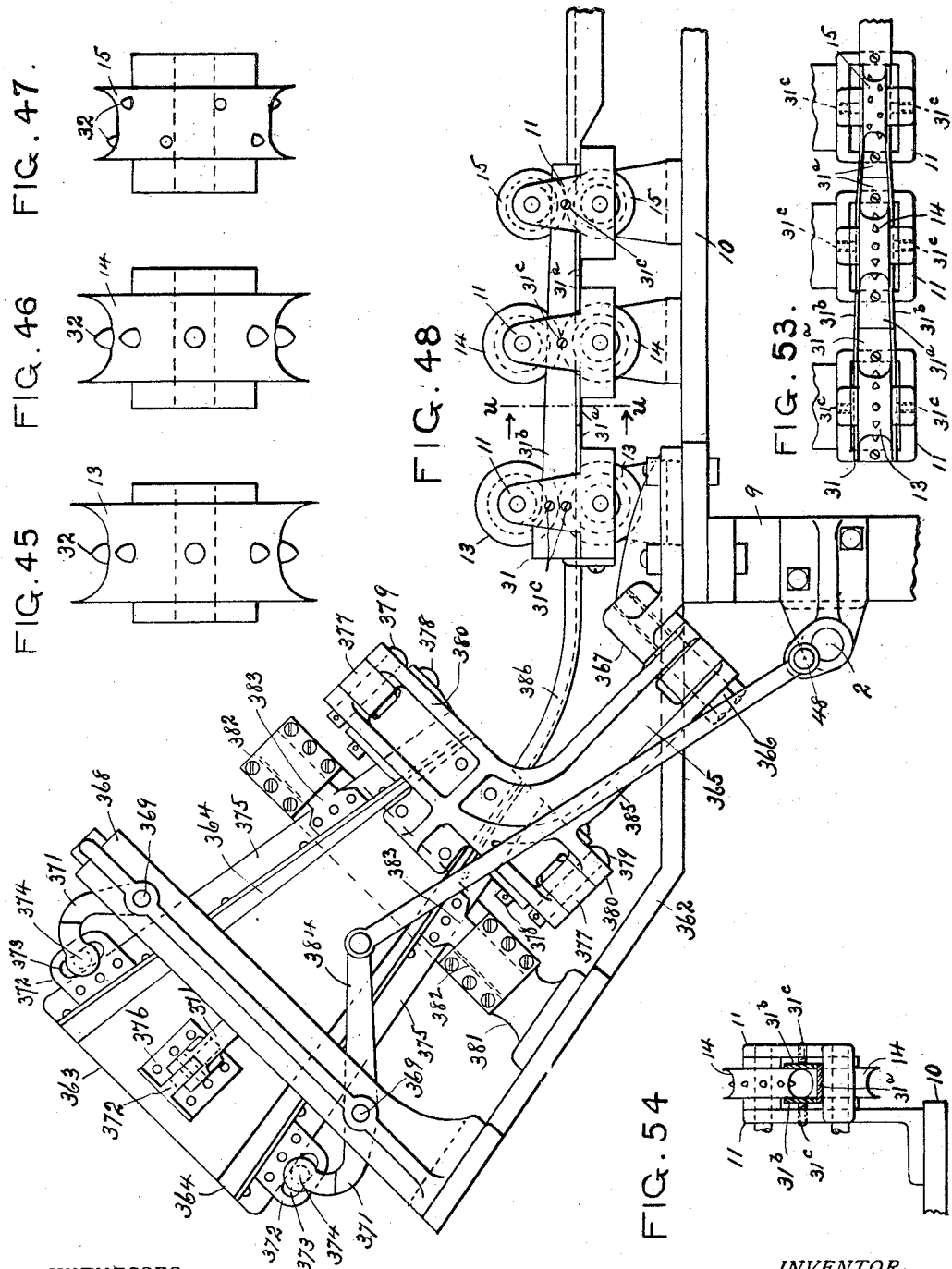

No. 852,560. PATENTED MAY 7, 1907.
D. T. IGOU.
MACHINE FOR FORMING AND WRAPPING CONFECTIONS AND OTHER ARTICLES.
APPLICATION FILED JAN. 26, 1906.
17 SHEETS—SHEET 17.

WITNESSES:
William F. Bauer
Ironie Miller

INVENTOR.
Dennis T Igou.
BY
H. A. Toulmin
ATTORNEY.

UNITED STATES PATENT OFFICE.

DENNIS T. IGOU, OF SPRINGFIELD, OHIO, ASSIGNOR TO THE STANDARD CANDY MACHINE COMPANY, OF COLUMBUS, OHIO, A CORPORATION OF OHIO.

MACHINE FOR FORMING AND WRAPPING CONFECTIONS AND OTHER ARTICLES.

No. 852,560.     Specification of Letters Patent.     Patented May 7, 1907.

Application filed January 26, 1906. Serial No. 298,023.

*To all whom it may concern:*

Be it known that I, DENNIS T. IGOU, a citizen of the United States, residing at Springfield, in the county of Clark and State of Ohio, have invented certain new and useful Improvements in Machines for Forming and Wrapping Confections and other Articles, of which the following is a specification, reference being had therein to the accompanying drawings.

This invention relates to machines for forming and wrapping confections and other articles, and is in the general nature of an improvement upon the machine set forth in an application filed by me March 26, 1903, Ser. No. 149,681, the present machine also embodying some of the features disclosed in an application filed by me December 23, 1903, Ser. No. 186,282.

The primary object of my present invention is to provide an automatic mechanism which will handle the candy from the batch without the assistance of manual labor, and which will form and wrap the confections automatically and deliver them completely formed and wrapped.

Among other objects of the present invention, the main object is to increase the output of the machine, increasing the speed and accuracy with which the various parts operate, with a special view to certainty as well as celerity of operation, so that the machine may be operated at very high speed without danger of clogging or failing to properly perform its various functions.

The invention has for its further object to provide certain improvements in the mechanism for feeding and forming the confections, for feeding and cutting into sheets the paper web from which the wrappers are made, and for wrapping these sheets around the confections, whereby the several mechanisms are rendered more efficient, accurate and rapid in operation.

To these and other ends my invention consists in certain novel features which I will now proceed to describe, and will then particularly point out in the claims.

Figure 2:
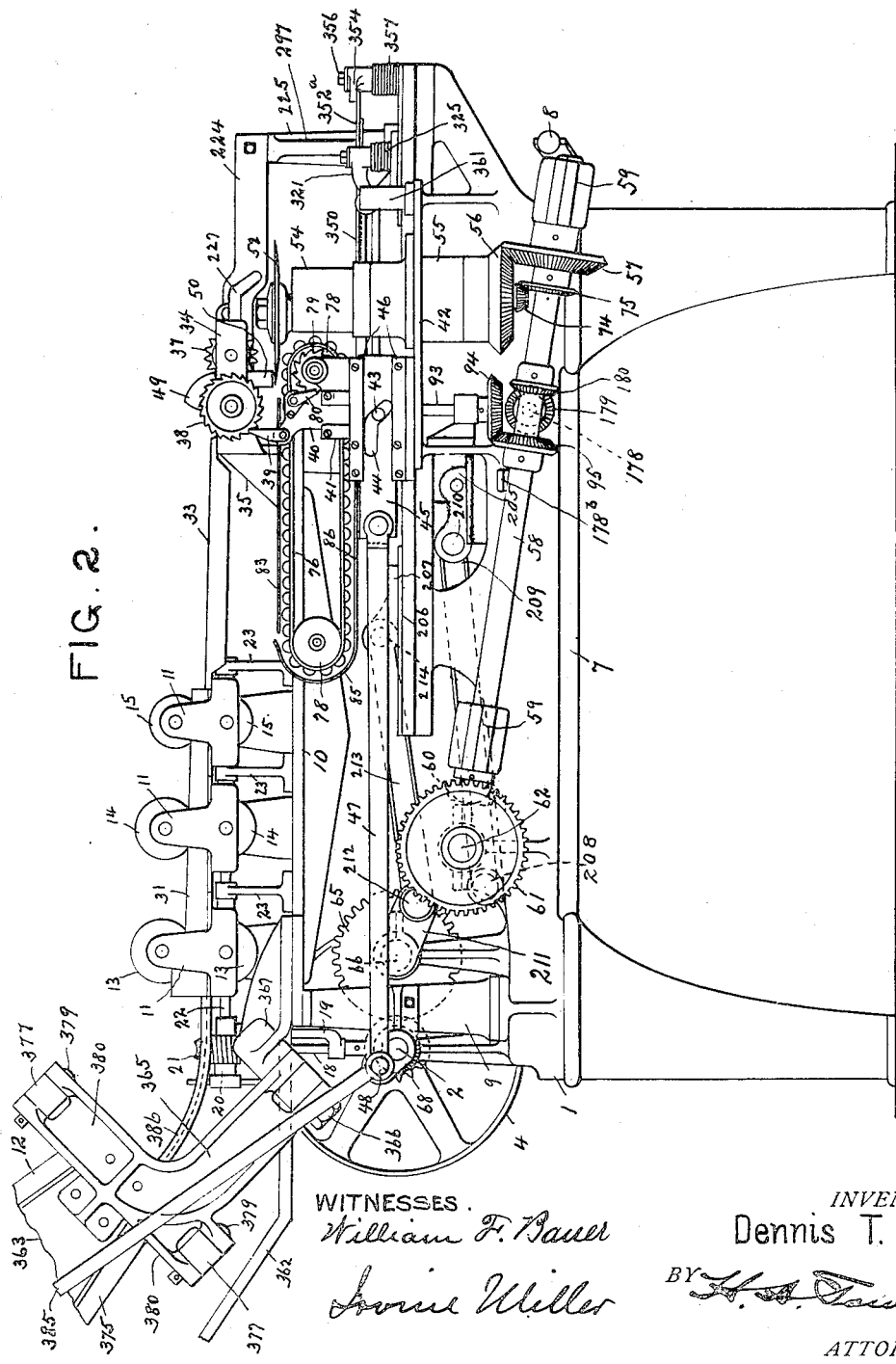
Figure 3:
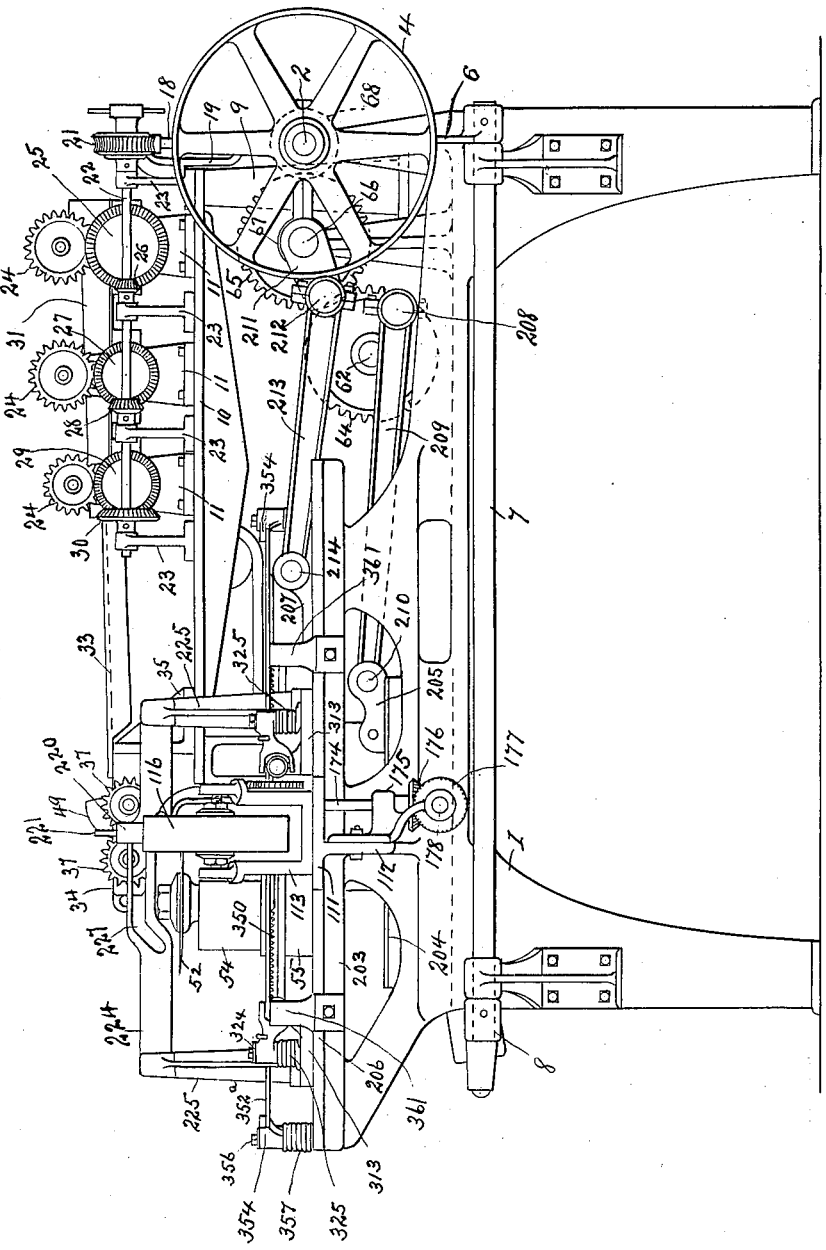
Figure 6:
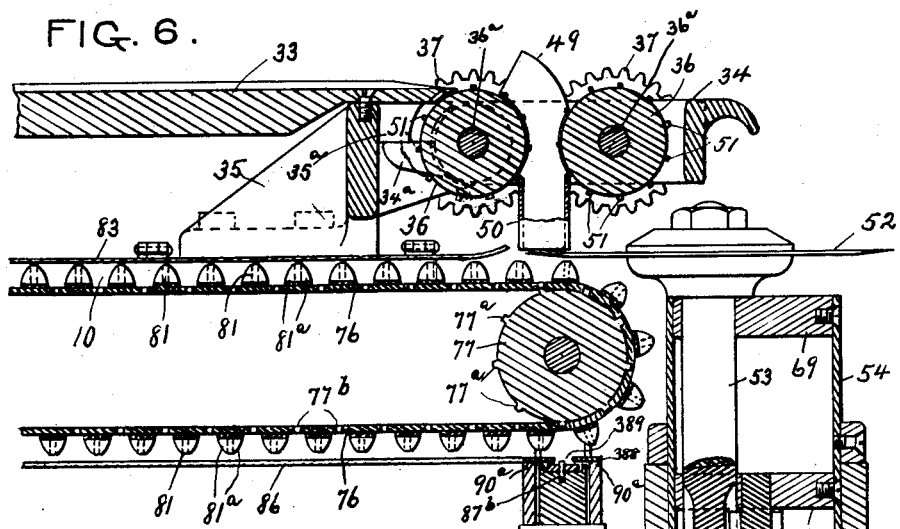
Figure 12:
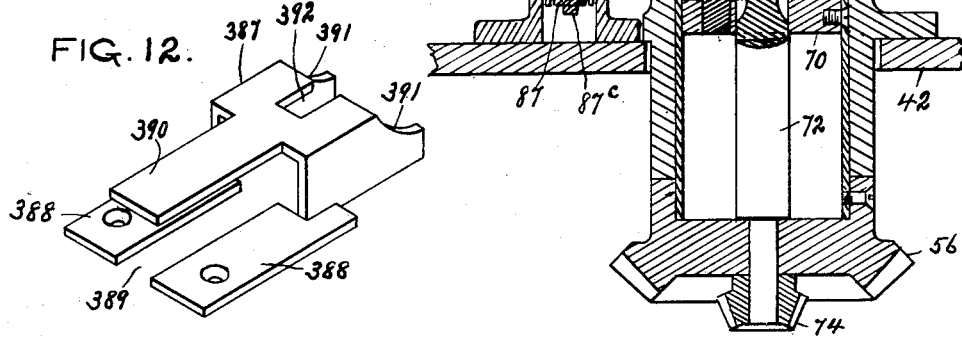
Figure 14:
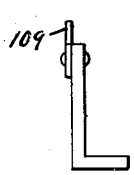
Figure 13:
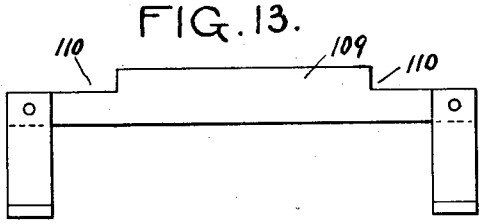
Figure 7:
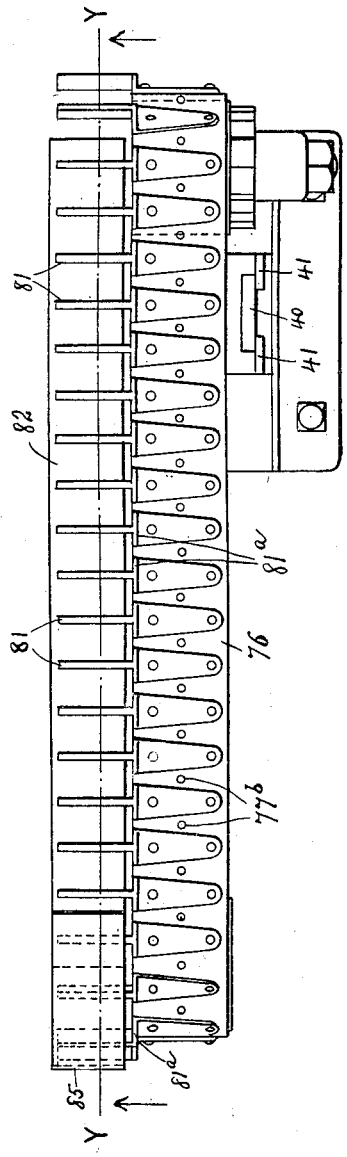
Figure 9:
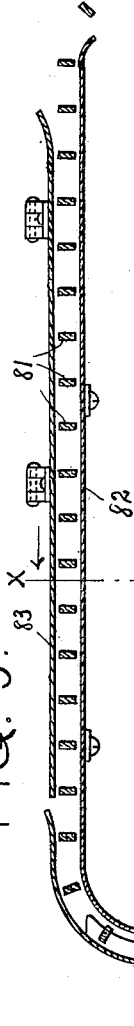
Figure 8:
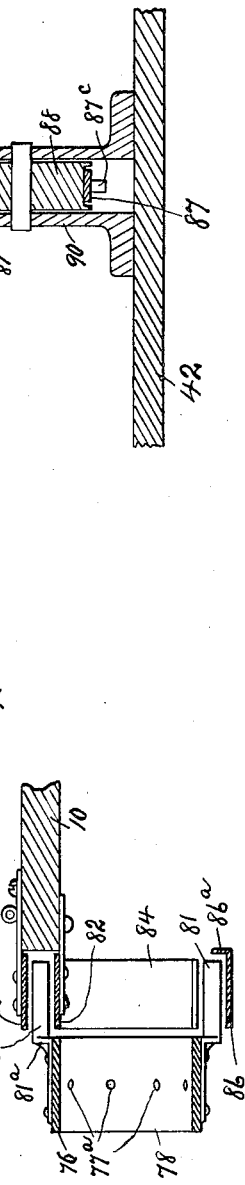
Figure 38:
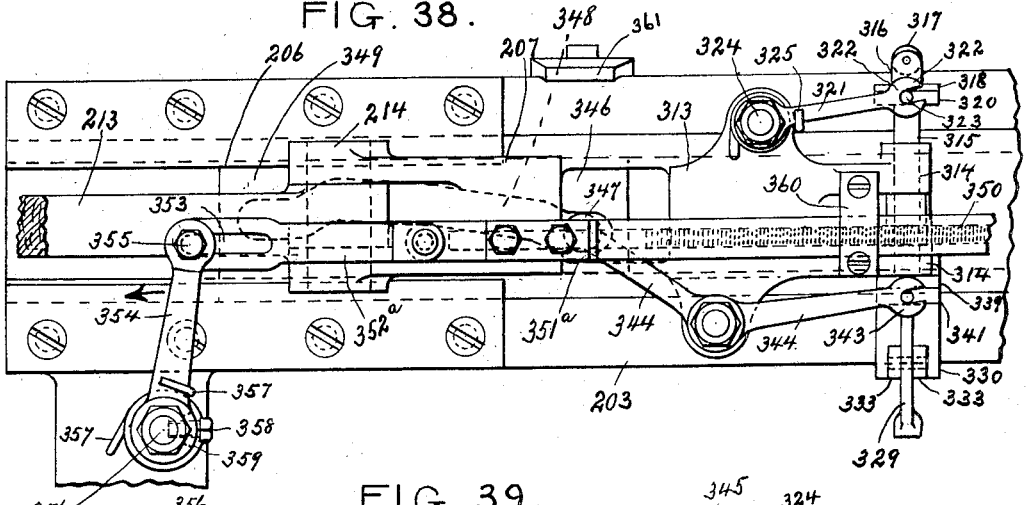
Figure 39:
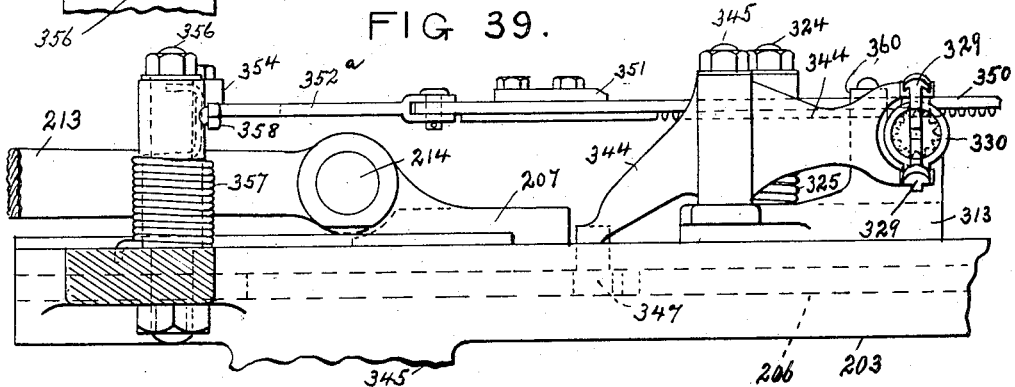
Figure 40:
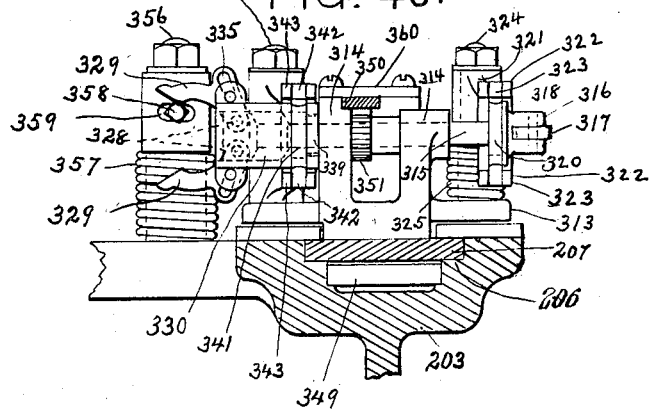
Figure 49:
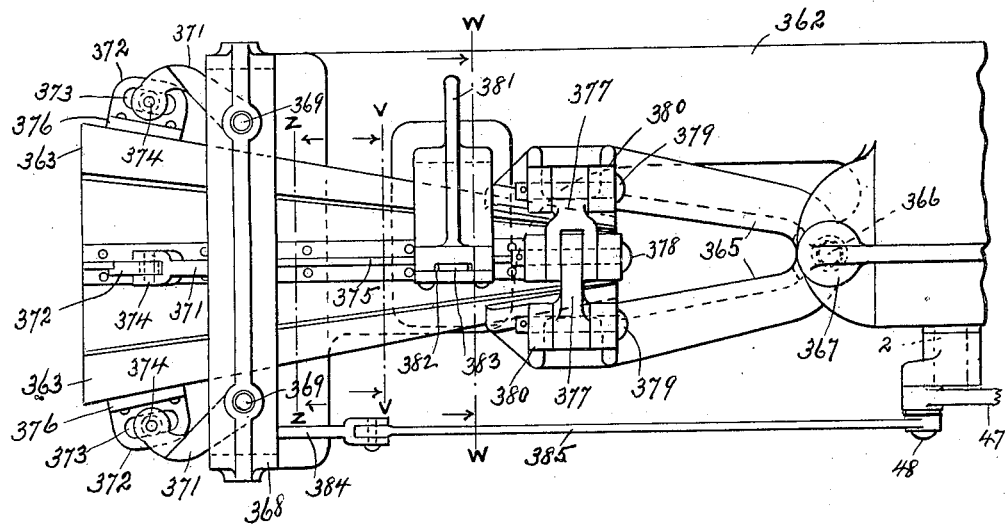
Figure 50:
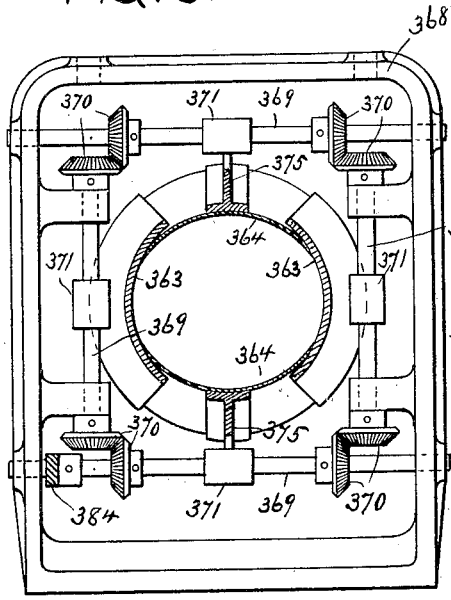
Figure 51:
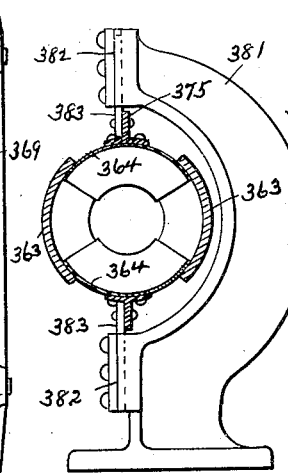
Figure 52:
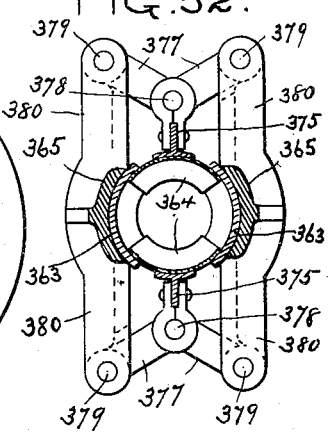

In the accompanying drawings, Figure 1 is a plan view of a machine embodying my invention in one form; Fig. 2 is a front elevation of the same; Fig. 3 is a rear elevation; Fig. 4 is an elevation of one end of the machine; Fig. 5 is an elevation of the other end of the machine; Fig. 6 is a detail sectional view taken in a vertical plane through the forming rollers and the parts lying below the same; Fig. 7 is a detail plan view of the shrinking or tempering conveyer, to which the confections are delivered after being severed from the bar which is delivered from the forming rolls; Fig. 8 is a transverse sectional view, taken on the line $x\,x$ of Fig. 9 and looking in the direction of the arrows; Fig. 9 is a longitudinal sectional view, taken on the line $y\,y$ of Fig. 7 and looking in the direction of the arrows; Fig. 10 is an enlarged view of a portion of Fig. 4, with the cutter and its supporting bearing omitted; Fig. 10$^a$ is a detail sectional view illustrating the mode of driving the delivering conveyer and sizing rolls; Fig. 11 is a plan view of the sizing rolls and their associated mechanisms; Fig. 12 is a detail perspective view of the guide which controls the travel of the confection in its discharge from the tempering feed to the sizing rolls; Fig. 13 is a rear elevation of the stop or cut-off plate, detached; Fig. 14 is an end view of the same; Fig. 15 is a plan view of the paper feeding and cutting mechanism; Fig. 16 is a side elevation of the same; Fig. 17 is a side elevation of the upper one of the first pair of paper feeding rolls, detached; Fig. 18 is an end view of the same; Fig. 19 is a similar view to Fig. 17, illustrating the lower one of the first pair of paper feed rolls; Fig. 20 is an end view of the same; Fig. 21 is an enlarged detail view of the gripping jaws, viewed in elevation from the side opposite to that shown in Fig. 16; Fig. 22 is a plan view of what is shown in Fig. 21; Fig. 23 is an elevation of the upper one of the second pair of paper feed rolls; Fig. 24 is an end view of the same; Fig. 25 is an elevation of the lower one of the second pair of paper feed rolls; Fig. 26 is an end view of the same; Fig. 27 is a view of the shaft which carries the feed roll shown in Figs. 23 and 24, the same being shown detached and with its spring and thrust collar mounted thereon; Fig. 28 is an elevation of the paper knife, detached; Fig. 29 is an end view of the same; Fig. 30 is a detail view of one of the bolts carried by said knife; Fig. 31 is a similar view of the corresponding sleeve-nut; Fig. 32 is an edge view of the cam which controls the paper knife; Fig. 33 is a face view of the same; Fig. 34 is a plan section, on an enlarged scale, taken immediately above the central portion of the wrapping mechanism and showing one of the four similar portions of said mechanism; Fig. 35 is an enlarged detail sectional view taken vertically through the central portion of the wrapping mechanism in a plane extending from front to rear of the machine; Fig. 36 is a detail elevation of one of the folding plates of the plunger; Fig. 37 is a similar view to Fig. 35, taken in a plane at right angles to the plane of Fig. 35; Fig. 38 is a detail plan view of one of the twisters and its associated mechanism; Fig. 39 is a side elevation of what is shown in Fig. 38; Fig. 40 is an end view of what is shown in Fig. 38; Fig. 41 is an enlarged face view of one of the twisters; Fig. 42 is a side elevation of the same, partly in longitudinal section; Fig. 43 is an end view of one of the rakes; Fig. 44 is a plan view of what is shown in Fig. 43; Fig. 45 is a detail elevation of one of the first pair of feeding rolls; Fig. 46 is a similar view of one of the second pair; Fig. 47 is a similar view of one of the third pair; Fig. 48 is an enlarged side elevation of the diminisher or batch support and the feeding rolls coöperating therewith; Fig. 49 is a plan view of the diminisher or batch support, detached; Fig. 50 is a transverse sectional view of the same, taken on the line $z\ z$ of Fig. 49 and looking in the direction of the arrows; Fig. 51 is a similar view, taken on the line $v\ v$ of Fig. 49 and looking in the direction of the arrows; Fig. 52 is a similar view, taken on the line $w\ w$ of Fig. 49 and looking in the direction of the arrows; Fig. 53 is a detail plan view of the candy feeding and drawing rolls; Fig. 54 is a detail sectional view of the same, taken on the line $u\ u$ of Fig. 48 and looking in the direction of the arrows; and Fig. 55 is a detail view of the wrapped article as delivered from the machine.

In describing the particular embodiment of my invention chosen for purposes of illustration, I shall first describe the candy-feeding and confection-forming mechanisms, by which the candy is drawn from the batch, formed into confections, and delivered to the wrapping mechanism. I will next describe the paper-feeding and cutting mechanism, by means of which the web of paper is drawn from the roll and severed into sheets to form the wrappers, and by which these wrappers are delivered to the wrapping mechanism to be wrapped around the confections. I will then describe the wrapping mechanism, by means of which the wrappers are wrapped around the confections, being folded around the same at their body portions, while their projecting ends are twisted to complete the package.

The machine as a whole is supported upon a frame indicated by the reference numeral 1, at one end of which is located the main driving shaft 2, supported in suitable bearings 3, and provided with a driving pulley 4, to receive a belt to drive the machine from any suitable source of power. The driving pulley may be connected with and disconnected from the shaft 2, in order to start or stop the machine, by means of a suitable clutch 5, controlled by an arm 6, mounted on one end of a rock shaft 7, located at the back of the machine, the other end of the rock shaft carrying a hand lever 8, which extends across the machine to the front thereof to a point within convenient reach of the operator.

*Candy-feeding & confection-forming machine.*—This mechanism comprises a suitable support for the batch of candy, means for automatically drawing the candy from the batch and feeding it forward to the forming rolls, at the same time forming it into a bar having a diameter such as to properly feed through and supply the forming rolls. The said mechanism further comprises forming rolls which give the confection its proper form and mass, coöperating to that end with a cutter which at predetermined intervals severs the bar fed from the forming rolls, thereby dividing the same into confections containing the predetermined amount of candy and having the general form desired. After the confections are thus formed, they are delivered to a tempering conveyer, which carries them along separately, exposing them to the atmosphere for a length of time sufficient to permit them to shrink and set somewhat. The shrinking and setting conveyer delivers the confections to a second conveyer, by means of which they are carried to the sizing rolls, which prevent excessive width of the confections, and from the sizing rolls another conveyer carries off the confections and delivers them to the wrapping mechanism.

The main frame 1 comprises uprights 9, which support a base plate or table 10, on which are mounted the feeding rolls and batch support. In the present instance I have shown three pairs of feeding rolls, but their number may be varied. Each pair is mounted in a suitable housing 11, supported on the base plate 10, and the housing 11 of the first pair of rolls has adjacent to it the batch support 12, which may be of any suitable construction.

The form of batch support which I prefer is one which I have devised, and which is illustrated more particularly in Figs. 48 to 52 of the drawings, inclusive, the same being in the form of a diminisher, which supports and holds the batch and at the same time gradually works the same and gives it an elongated tapering form, of a diminishing diameter, just as the batch is ordinarily manipulated by the hands of the operator when this work is manually done. An advantage of considerable importance in connection with this diminisher is that it enables me to handle a larger batch, and at the same time employ a smaller number of feeding and drawing rolls for drawing the candy from the batch and delivering it in a stick or bar of the desired diameter at the point where it is to be further worked.

Referring now more particularly to the detailed construction of this device, it will be seen that it is mounted upon a bracket 362, and stands at an inclination to the horizontal sufficient to cause the candy to tend to feed outward from the same by gravity. The body of the support or diminisher consists of a receptacle of conical form, open at both ends, the larger end, which is elevated, being the receiving end, and the smaller end, which is depressed, being the discharge end or outlet. The body of this receptacle is composed of a plurality of sections or staves, which are moved toward and from the axial central line of the receptacle while always remaining in contact with each other so as to maintain a closed wall surrounding the batch of candy. To effect this result some of the sections or staves are made of resilient material. In practice, I prefer the construction shown, in which the body of the receptacle is composed of four sections or staves, these sections being arranged in two pairs, the two sections of each pair being similar and arranged diametrically opposite each other. In this construction there are two sections 363, preferably of a material of a thickness sufficient to render them substantially rigid, and two sections 364, of a resilient material such as thin sheet steel, each section 364 lying between two of the sections 363, with its beveled margins overlapping and always bearing against the inner faces of the sections 363. The receptacle thus constituted is supported in the following manner. The rigid sections 363 have connected to their lower depressed ends arms 365, which extend downward and forward and are pivoted upon a stud 366, mounted in a sleeve or hub 367 formed on the bracket 362. The outer end of the bracket 362 supports a substantially rectangular frame 368, in which are supported four shafts 369, arranged at right angles to each other in parallel pairs, two of said shafts being located respectively above and below the larger end of the receptacle, while the other two are located at the sides thereof. These shafts are all connected by bevel gears 370, so as to rotate in unison. Each shaft is provided with a central arm 371, the free end of which is pivotally and slidingly connected to one of the sections of the receptacle body. This connection is preferably effected in the manner shown, by providing each section with a lug 372, having a slot 373 to receive a pin 374, supported in the bifurcated free end of the arm 371. The resilient sections 364, being of relatively thin material, are centrally strengthened by having secured to them a longitudinally extending bar 375, preferably T-shaped in cross section, as shown, and it is to these bars that the lugs 372 of the resilient sections are secured. The lugs 372 of the rigid sections 362 have bases 376, by means of which they are directly riveted to the relatively fixed bodies of the sections 363. It will be seen that the sections 363 are thus supported and guided at both ends, their lower ends being supported by the pivoted arms 365 and their upper ends by the arms 371. The thin resilient sections 364 are supported at their upper ends by the arms 371, while their lower ends are supported by toggle links 377, arranged in pairs above and below the receptacle. These links have their inner adjacent ends pivoted to each other and to the smaller ends of the sections 364, as indicated at 378. The outer ends of said links are pivoted, as indicated at 379, to arms 380, which move in unison with the sections 363. In the present instance, I have shown these arms 380 as forming extensions of the arms 365, but they may obviously be made separate therefrom.

As an additional means for supporting and guiding the resilient sections 364, which are somewhat loosely supported at their ends, I provide a support or standard 381, mounted on the bracket 362, and provided with guides or slideways 382, arranged respectively above and below the receptacle. The resilient sections 364 are provided with guiding projections or slides 383, which fit within the slideways 382 so as to support the sections against lateral displacement, while at the same time leaving them free to rock somewhat in a plane longitudinally of the device to render them self adjusting. Motion is imparted to the entire device by means of an arm 384, secured to one of the shafts 369. This arm is vibrated by means of a link or connecting rod 385, pivoted at its upper end to the free end of the arm 384, while its lower end is connected to the crank 48 on the main shaft 2, hereinafter referred to. It will be understood that the normal curvature of the resilient sections 364 is such that when the receptacle is expanded to its greatest diameter, as shown in the drawings, the longitudinal edges of said resilient sections press against the adjacent faces of the intermediate sections. This being the case, as the sections move inward toward each other, the resilient sections will always have their said edges pressed against the inner faces of the adjacent sections, the same being true when the sections are moving outward again. Thus, a receptacle is provided having a constantly continuous inclosing wall, which receptacle is conical in shape, diminishing in diameter toward its discharge end, said diameter constantly diminishing and increasing as the sections move toward and from the central axial line, while the position of said central axial line relatively to a horizontal plane is such that as the candy is thus squeezed and released alternately, it works down by gravity and passes out through the discharge end of the receptacle in the form of a bar or stick of a diameter such that it can be readily handled by the first pair of feeding and drawing rolls. A guide trough 386 extends from the discharge end of the diminisher to said first pair of drawing rolls, so as to support the candy in its passage from the diminisher to the rolls.

The feeding rolls, which draw the candy from the batch and deliver it to the forming rolls, are, as to their main features, constructed in accordance with my prior application, Ser. No. 186,282, hereinbefore referred to. The first pair of rolls, indicated by the reference numeral 13, have peripheral grooves which are deeper than those of the following pairs, so that the aperture formed by said grooves at the meeting portions of the rolls 13 is larger than the similar apertures of the succeeding pairs. The grooves of the second pair of rolls 14 are smaller than those of the first pair 13, and the grooves of the last pair of rolls 15 are smaller than those of the pair 14. The candy is thus gradually reduced in diameter as it passes through these feeding rolls. Moreover, each pair of rolls is speeded up to a somewhat greater peripheral velocity than the preceding pair, the pair 13 being the pair having the least speed, the speed of the pair 14 being greater, and the speed of the pair 15 still greater. This increase in speed is effected by any suitable means, preferably that shown. In this construction the shaft 2 is provided with a bevel gear 16, which meshes with a bevel gear 17 on the lower end of a vertical shaft 18, mounted in a bearing bracket 19, carried by the base plate 10. At its upper end the shaft 18 carries a worm 20, which meshes with a worm wheel 21 on a longitudinal shaft 22, extending along one side of the feeding rolls and supported in bearing brackets 23 from the base plate 10. Each pair of rolls is provided with intermeshing gears 24, by means of which each pair is driven in unison, and one of the roll shafts of each pair, preferably the lower shaft, is extended to carry the bevel gear. The bevel gear 25 of the first pair of rolls 13 meshes with a bevel gear 26 on the shaft 22, the bevel gear 27 of the second pair of rolls 14 meshes with a bevel gear 28 on the shaft 22, and the bevel gear 29 of the third pair of rolls 15 meshes with a bevel gear 30 on the shaft 22. From an inspection of Fig. 1 of the drawings it will be seen that the respective pairs of bevel gears are so proportioned as to give the desired increasing speed to the successive pairs of feed rolls.

A suitable trough 31 is located between the feed rolls to support the candy on each side of the rolls. This trough comprises a bottom made up of sections or plates $31^a$, extending from the working face of each roll outward in each direction to a meeting with the adjacent bottom plate or section. Said trough further comprises side plates $31^b$, which are continuous along the entire series of rolls, fitting against the outer faces of each roll, the portions of these side plates between each pair of rolls converging to cause the trough to successively narrow to conform to the successively smaller width of the pairs of rolls. These side plates pass between the side plates of the housings 11 and the lateral faces of the rolls, and are pressed against the lateral faces of the rolls by means of screws $31^c$, threaded through the housings and bearing against the outer faces of the plates. Two or more of these screws $31^c$ are caused to enter the plates $31^b$ sufficiently to prevent displacement thereof, but by withdrawing said screws, the plates may be readily withdrawn from their positions when it is desired to remove them. The rolls are also preferably provided with projecting teeth 32 in their grooved faces, to better engage and more positively feed the candy. The arrangement which I prefer for these teeth is that shown, in which the projecting teeth of the first two pairs of rolls are located centrally in the grooves thereof, while the teeth of the last pair are located on the lateral portions of the grooves. These feeding rolls draw the candy from the batch and feed it forward with a drawing or stretching action, reducing the diameter of the bar by degrees as the candy advances, and stretching it or drawing it out so as to take up the slack which would otherwise form between the rolls by reason of the reduction of the diameter of the bar. These rolls deliver the bar of candy thus formed upon a runway or table 33, along which it travels to the forming rolls.

The forming rolls are mounted in a housing 34, supported by a bracket 35 from the base plate 10. The rolls are indicated by the reference numeral 36, and are two in number, arranged parallel with each other with their shafts $36^a$ preferably in a horizontal plane, so that the bar of candy changes its course to one at right angles downward in passing between the forming rolls. The housing 34 is pivotally supported on one of the shafts $36^a$, the latter being mounted in the arms of the bracket 35, so that the entire housing and the rolls and other parts supported thereby may be swung up into vertical position to give access to and permit the withdrawal of the cutting disk in the manner hereinafter set forth. To support the housing in its normal horizontal position, as shown, the bracket 35 is provided with lugs $35^a$, underneath which engage lugs or extensions $34^a$ on the housing, as shown more particularly in Fig. 6. The rolls are provided at one end of their shafts with gears 37, to cause them to rotate in unison, and motion is imparted to them by means of a ratchet wheel 38, secured on the shaft of one of the rolls. This ratchet wheel lies in the path of a spring pawl 39, carried by a slide 40, moving vertically in guideways 41 carried by the frame 1, which frame has a table or bracket 42, supporting said guideways and other parts hereinafter referred to. The slide 40 is provided with a pin or projection 43, preferably in the form of a roller, which engages in a cam slot 44, formed in a slide 45, traveling horizontally in guideways 46 supported on the bracket 42. A connecting rod 47 has one of its ends pivoted to the slide 45, its other end being connected to a crank 48 on the end of the main shaft 2, whereby a reciprocating motion is imparted to the slide 45, which, through its cam slot, imparts a similar reciprocating motion to the slide 40. This latter, through its pawl 39 and the ratchet wheel 38, gives an intermittent movement of rotation to the forming rolls 36, causing these latter to feed the bar of candy forward a distance sufficient to present it to the cutter in such a way as to have a piece of the desired length cut from the end thereof. The amount thus fed forward may be regulated by the ratchet wheel 38, of which a plurality may be employed, having different teeth to give different feeds. The width of the bar in one direction is controlled by the distance between the opposite faces of the rolls 36, while in the other direction it is controlled by side plates 49, which, below the rolls 36, are closed in on all sides so as to form a tube or chute 50, through which the candy is fed to the knife. Preferably, I provide the rolls 36 with projecting pins or teeth 51, to make the feed of the candy more positive.

The severing of the confection from the end of the bar which protrudes beyond the tube 50 is effected by means of a disk cutter 52, mounted on an eccentric arbor 53, projecting from the upper end of a vertical shaft 54, which latter is supported in a bearing 55 supported on the bracket 42. The shaft 54 has at its lower end a bevel gear 56, which meshes with a similar gear 57 on a shaft 58, supported in bearings 59 on the front of the frame 1. The shaft 58 is provided at one end with a bevel gear 60, which meshes with a bevel gear 61 on the front end of a crank shaft 62, extending transversely of the machine, being supported in suitable bearings 63. The bevel gear 61 is mounted on the front end of this shaft, and on the other end there is mounted a spur gear 64, which meshes with a similar gear 65 on the second crank shaft 66, supported in bearings 67 on the main frame 1. The gear 65 meshes with a pinion 68 on the main shaft 2, so that rotary motion is thus imparted to the crank shafts 66 and 62, and to the shaft 58 from which the cutting disk 52 is driven.

The cutting disk 52, owing to the eccentric relation with which it is mounted in the shaft 54, is projected across the lower end of the tube 50 at the time when the forming rolls are stationary, and thereby severs the confection from the bar of candy, which latter is supported by the tube to meet the thrust of the cut. To properly coöperate with the tube, the cutting disk is flat or plane on its upper side, the bevel being on the lower side.

Preferably, the cutting disk 52, in addition to the movement of rotation imparted to it by the eccentric relation which it bears to the shaft 54, is also positively rotated on its own axis. To this end the shaft 54 is made hollow, and the mandrel 53 which carries the cutting disk 52 is mounted to rotate in suitable bearings in the heads or disks 69 and 70, secured in the upper and central portions of the hollow shaft 54. The lower end of the mandrel 53 is provided with a gear 71, preferably formed by grooving the lower end of the mandrel longitudinally, so that the cutting disk and mandrel may be readily removed by a direct upward pull, and as readily replaced.

72 indicates a vertical shaft mounted centrally within the hollow shaft 54, being supported in suitable bearings in the disks or heads 70 and in the body of the gear 56. The upper end of this shaft is provided with a gear 73 to mesh with the gear 71, while the lower end of said shaft projects below the gear 56 and carries a bevel pinion 74, which meshes with a gear 75 on the shaft 58. By reason of this construction, the cutting disk 52 and its mandrel are independently rotated at a relatively high speed in a direction opposite to the direction of rotation of the shaft 54 in which they are mounted. I have found, in practice, that the cutting disk thus mounted and operated will effectually sever the confections from the bar without crushing the same and without causing the candy to stick either to the knife or to the tube.

After the confections are thus formed they are delivered to a tempering or shrinking conveyer, by means of which they are exposed to the atmosphere for a considerable period before being delivered to the wrapping mechanism, in order to get them into better condition for handling by the wrapping mechanism. In its preferred form, which is that shown, this conveyer comprises a belt 76, passing around pulleys 77 and 78, arranged with their axes in the same horizontal plane at the front of the machine, along which the belt extends lengthwise. The pulleys have studs 77$^a$ and the belts apertures 77$^b$, to prevent slipping of the belt. The shaft of the pulley 77 carries a ratchet wheel 79, with which engages a pawl 80 on the vertically moving slide 40, so that intermittent movement is imparted to the belt 76, in unison with the intermittent movement of the forming rolls 36. The belt is provided with laterally projecting fingers 81, which extend over a support or runway 82, fixed to the front of the machine. The fingers 81 are located a sufficient distance apart to receive the confections between them and carry them along over the support or runway 82, on which they rest. As each confection is formed and severed by the cutting disk 52, it drops upon the receiving end of the support 82 between two of the fingers 81, and is carried along the same. Preferably, a hinged cover 83 extends over the support 82 above the fingers which travel over the same, to protect the confections and hold them in place between the fingers, the hinging of said cover permitting it to be readily lifted to have access to what lies below it. The discharge end of the support or runway 82 is curved downward in approximately semicircular form, as indicated at 84, this curve lying within a similar curved portion 85 of a second support or runway 86, which lies below the pulleys 77 and 78. The curved portions 84 and 85 serve as guides for the confections in passing from the runway 82 to the runway 86, and it will be noted that the confections are inverted in passing from one runway or support to the other, so that their upper and lower sides are successively exposed to the atmosphere.

It will be observed that the fingers 81 are provided on those parts thereof which lie immediately adjacent to the meeting edges of the belt 76 and runways 82 and 86, with lateral flanges 81ª, which flanges are of extent sufficient to prevent the confections from being displaced laterally from the runways in the direction of the belt. From an examination of Fig. 8 it will be seen that the opposite side of the upper runway 82 is closed and protected by the edge of the base plate or table 10, so that the confections cannot escape from the runway laterally in that direction, or over the inner edge of the runway. It will also be noted that the lower runway 86 is provided with an upstanding flange 86ª on its inner margin, which prevents the confections from being displaced or escaping laterally over the inner edge of the lower runway.

From an inspection of Fig. 2 of the drawings it will be seen that the cam slot 44 in the slide 45 is provided with an inclined portion and a straight portion, the former being the actuating portion of the slot, which imparts an up and down movement to the slide 40, while the latter is a dwelling portion, so that during all of the time that the projection 43 is in this straight or dwelling portion, the slide 40 is stationary, and neither the forming rolls nor tempering conveyer is in movement. It is during this stationary period of these parts that the cutting disk acts to sever the confection and the latter is delivered between the fingers of the tempering conveyer. As soon as this has been done, the slide 40 first moves downward, thereby actuating the tempering conveyer, carrying off the confection just delivered, and bringing forward another space between two fingers of said conveyer to receive the next confection. The slide 40 then moves upward, thereby actuating the forming rolls to feed forward the portion of the bar of candy which is to constitute the next confection; and thereafter the tempering conveyer and forming rolls remain stationary until after this next confection is severed from the bar and delivered to the conveyer, whereupon the operation proceeds as before.

From the tempering or drying and shrinking conveyer the confections are delivered to another conveyer, by means of which they are carried to the sizing rolls. This conveyer consists of a belt 87, mounted on pulleys 88 and 89, said belt extending transversely of the machine and its top portion running from front to rear. The pulleys 88 and 89 are mounted in a frame 90, which is supported on the bracket 42 of the main frame. This belt is driven by means of a bevel gear 91 on the shaft of the pulley 89, with which bevel gear there meshes a pinion 92 on the upper end of a shaft 93, the lower end of which is provided with a bevel gear 94, which meshes with a bevel gear 95 on the shaft 58. The belt 87 is provided with apertures 87ª, while the pulleys 88 and 89 are provided with pins or projections 87ᵇ adapted to engage said apertures and prevent slipping of the belt on the pulleys, thus making the feed positive. Said belt is further provided at suitable intervals with projections 87ᶜ, which are preferably of less width than the belt. At the point where the confections are delivered to this conveyer there is located a guide, indicated as a whole by the reference numeral 387, and shown in detail in its preferred form in Fig. 12 of the drawings. The sides of the frame 90 between which the belt 87 runs are raised at their front portions to about the height of the top of the belt, as indicated at 90ª, and these raised sides serve to support the guide, which latter comprises two horizontal supporting members 388, resting on top of the parts 90ª and having between them a space or slot 389 of a width sufficient to permit the passage of the projections 87ᶜ, which extend above the supporting plates 388 a distance sufficient to engage the confections. These latter are delivered from the runway 86 onto the supporting plates 388 by the fingers 81, and, while the belt 87 is stationary, one of the conveying projections 87ᶜ will engage the confection lying upon the supporting plates 88 and will carry it forward along said supporting plates until it enters the guide proper 387 and drops upon the body of the belt 87. A guard plate 390, extending forward from the body of the guide 387, projects over the confection as it lies upon the supporting plates 388 and prevents vertical displacement thereof, the conveying fingers 81 traveling between the plates 388 and 390 in the manner indicated in Fig. 6 of the drawings. The body of the guide 387 incloses the confection at the top and sides to insure its being retained in position on the belt until it is delivered to the sizing rolls. The sides of the frame 90 and of the guide 387 are cut away so as to permit the sizing rolls to extend inward over the belt. These sizing rolls consist of two rolls 97, rotating in a horizontal plane immediately above the belt 87, so that the confections must pass between said sizing rolls. Said rolls are set with their peripheries at such a distance apart at their closest point as to give to the confections the exact width desired and prevent the passage to the wrapping mechanism of any confection having a width greater than the predetermined maximum, thereby insuring the proper operation of the wrapping mechanism. The sizing rolls 97 have their shafts 98 mounted in bearings 99 on the frame 90, the lower end of each shaft 98 being provided with a bevel gear 100, by means of which the sizing rolls are driven. The bevel gear 100 of one of the rolls meshes with the bevel gear 91 on the shaft of the pulley 89, and the bevel gear 100 of the other sizing roll meshes with a similar bevel gear 96 on the other end of the shaft of the pulley 89. One of the shafts 98, preferably the former one, is extended upward and provided at its upper end with a bevel gear 101, by means of which is driven the conveyer which delivers the confections to the wrapping mechanism, which latter conveyer may be conveniently termed the delivering conveyer.

The delivering conveyer just referred to comprises a runway or support 102, with lateral guard flanges 103, which receives the confections as they are delivered from the belt 87 and sizing rolls 97. Said conveyer further comprises a belt 104, passing around pulleys 105 and 106, mounted in the frame 90. The pulley 105 is provided with a bevel gear 107, which meshes with the bevel gear 101 to drive the belt 104. The belt 104 is provided with apertures 104$^a$, and the pulleys 105 and 106 are provided with pins or projections 104$^b$ to engage the same and prevent slipping of the belt. The guide 387 is cut away at the rear, as indicated at 391, to accommodate the pulley 105 and belt 104. The lower stretch of this belt runs immediately above the runway 102, and said belt is provided at suitable intervals with projections 108, which serve to successively engage the confections and carry them along the runway to their point of delivery to the wrapping mechanism. The guide 387 is notched, as indicated at 392, to permit the passage of the projections 108. In order to insure the delivery of the confections to the wrapping mechanism at equal intervals and prevent their being dragged along by the body of the belt 104 at the wrong time, instead of being carried along by the projections 108 at proper intervals, I provide a stop or cut-off mechanism which will hold each confection stationary when and after it enters the runway 102 until one of the projections 108 engages it. Said stop or cut-off consists of a plate 109, working transversely of the runway 102, said plate being carried by a reciprocating slide 207 to be hereinafter referred to and forming part of the wrapping mechanism, the movement of this slide being such that it comes to rest alternately on one side and the other of the runway. The stop plate 109 is provided with a central body portion of a height such as to prevent the passage of the confection along the runway 102. The body of the stop plate on each side of this recess is cut away, as indicated at 110, in such a way as to permit the passage of the confections along the runway when they register with the same. Thus the runway is closed by the body of the plate at all times except at the moment when one of the projections 108 has to pass the same, and in this closed position the confection is held stationary in the runway and cannot be dragged along by the body of the belt 104. When one of the projections 108 engages the confection lying in the runway, the stop plate 109 is stationary in one position or the other, as the case may be, so as to bring one of the openings 110 into alinement or registry with the runway and permit the projection 108 to carry the confection past the stop plate and deliver it to the wrapping mechanism.

It will be noted that from the time when the confections are formed by severing from the bar and delivering them to the tempering conveyer, in their forward movement toward the wrapping mechanism they are always so inclosed as to prevent displacement thereof, and are always positively guided and positively moved, so that their proper delivery at predetermined intervals to the wrapping mechanism is insured.

*Paper-feeding & wrapper sheet forming mechanism.*—This mechanism draws a web of paper suitable for forming wrappers, preferably what is known as waxed or paraffin paper, from a continuous roll, feeding the same forward rapidly and smoothly, severing it into sheets of the proper size to form wrappers, and delivering these sheets to the wrapping mechanism simultaneously with the delivery of the confections by the mechanism already described. Said paper feeding mechanism comprises a suitable base 111, forming the top of a bracket 112 projecting from the rear of the main frame 1. This base supports a bearing bracket 113, comprising parallel side members 114, which support the various moving parts.

The paper, the web of which is indicated by the reference numeral 115, is supplied in the form of a roll 116, which is secured on a shaft 117 by means of clamping disks 118 and nuts 119, so as to rotate in unison with said shaft. The shaft 117 is mounted in bearings 120, which are split or divided, as shown in Figs. 15 and 16, the two parts being connected by a screw 121, by means of which the bearings may be clamped upon the shaft 117, so as to act as a brake upon said shaft, and thus give the necessary tension to the paper. The bearings 120 fit removably upon inclined studs 122, shown in dotted lines in Fig. 16, projecting from the bracket members 114, the construction being such that the roll of paper and its bearings may be readily removed and replaced.

The web of paper, after it leaves the roll, passes through the feed rolls, of which two pairs are shown in the present instance, although a greater number of pairs of feed rolls may be employed if desired. The first pair of feed rolls through which the paper passes are shown in detail in Figs. 17 to 20 of the drawings, inclusive. The lower roll of this pair, indicated by the reference numeral 123, is a cylindrical roll, secured upon a shaft 124, the bearings of which are mounted in the members 114, and are vertically adjustable by means of screws 125, in order to bring the lower feed roll into proper relation of the upper feed roll. The upper feed roll of this pair, indicated by the reference numeral 126, is mounted upon a shaft 127, having suitable bearings in the frame members 114. The shafts 124 and 127 are respectively provided with gears 128 and 129, which intermesh so as to cause the rolls to rotate in unison. The feed roll 126 is grooved circumferentially at its central portion, and in the groove thus formed there is located a band or covering 130, of yielding material having good gripping qualities, leather being preferable for the purpose. The feed roll 126 is also cut away or flattened longitudinally on its opposite sides, as indicated at 131 and 132, and these flattened portions are utilized for the securing devices which hold the leather covering to the roll. The meeting ends of the leather are secured on the flattened surface 132 by screws or nails 133, while the portion of the leather which lies on the flattened surface 131 is secured in position by means of a fastening strip 134 and screws or nails 135. The portions of the leather covering between the flattened sides form feeding surfaces 136. The construction is such that the several pairs of feed rolls feed intermittently, and, in the present instance, where only two pairs of feed rolls are employed, each pair of feed rolls is provided with two feeding surfaces, the number of feeding surfaces employed being preferably identical with the number of pairs of feed rolls, and the feed rolls having their feeding surfaces so arranged that, while one of the pairs is always engaged with and feeding forward the paper, each pair in turn releases its grip upon the paper at intervals. The reason for this mode of construction and operation lies in the fact that it is extremely difficult to feed a web of paper forward in a straight line with feed rolls in constant contact therewith, owing to the inequalities in the paper, inaccuracies of the rolls and their adjustment, and other causes. When the paper once begins to depart from the proper line of feed, it tends to increase the error, particularly where more than one pair of rolls is employed, and the mechanism is apt to clog and break. By employing a plurality of feed rolls in intermittent alternating contact with the paper, each pair of rolls tends to correct the inaccuracies of the other rolls, and has an opportunity to do so, since the other rolls release the paper and leave it free to be guided by the particular pair of rolls which is engaged in feeding at that time. Thus the inaccuracies of the feeding mechanism are constantly corrected and have no opportunity to increase. The accuracy of the feed is further maintained by reason of the fact that only a relatively narrow area of the central portion of the web is actually gripped, thereby reducing the liability of inaccurate feeding in proportion to the reduction of the surface engaged.

Referring now to the second pair of feed rolls, the lower roll, indicated by the reference numeral 137, is substantially cylindrical in form, and is mounted on a shaft 138, the bearings of which are vertically adjustable in the members 114 by means of screws 139, as in the case of the bearings of the shaft 124. The roll 137 is provided on its outer surface with a longitudinal slot or groove 140, to receive the knife carried by the coöperating roll, and on each side of this groove there is located a gripper 141, preferably of leather, extending longitudinally of the roll parallel with the slot. These grippers, with two similar grippers on the coöperating roll, serve to grip the paper on each side of the line of cut and hold the same firmly while it is being severed. The upper one of the second pair of feed rolls, indicated as a whole by the reference numeral 142, is mounted upon a shaft 143, to which it is secured by a pin 144, or in any suitable manner. The shaft 143 has its bearings in the members 114, and is provided with a gear 145, which meshes with a similar gear 146 on the shaft 138 of the roll 137, to cause the two rolls to rotate in unison. The roll 142 is circumferentially grooved at its central portion to receive a covering of leather or the like, indicated at 147, the same being similar to the leather covering 130 of the roll 126, and being secured in a similar manner. The roll 142 is flattened longitudinally on one side, as indicated at 148, the leather being there secured by a fastening strip 149 and fastening devices 150. On the opposite side, the bottom of the groove or recess in which the leather is fastened is flattened at each end of said groove or recess, which does not extend entirely around the roll in this case, and the ends of the leather are turned in at these flattened portions and secured by fastening devices 151. That portion of the roll which lies below the leather in the position of the parts shown in Fig. 24 is of less diameter than the maximum diameter of the roll, including the leather covering, so that, in this case also, there are formed two feeding surfaces 152, with intermediate non-feeding surfaces, as in the case of the upper roll of the first pair. It will be understood that the two upper rolls have their feeding surfaces so arranged relatively to each other that one pair of rolls grips and feeds the paper while the other pair releases the paper. It will also be understood that the leather covering is somewhat thicker than the depth of the seat in which it is located, so that the feeding is accomplished by those portions of said covering which extend out beyond the body of the roll, said body having no feeding functions. That portion of the body of the roll 142 which is diametrically opposite to the flattened portion 148 is provided with a longitudinally extending radial slot 153, on each side of which are located parallel longitudinally-extending grippers 154, which coöperate with the similar grippers 141 of the roll 137. In the slot 153 there is located a knife 155, which may be projected from and withdrawn into the roll by mechanism provided for that purpose. To this end the knife is provided near each extremity with a transverse pin or bolt, extending laterally therefrom on each side. Preferably, these pins or bolts are constructed in the manner shown in detail in Figs. 30 and 31 of the drawings. Each comprises a bolt proper 156, having a large cylindrical head 157 and a reduced threaded shank 158. This shank is passed through an aperture 159 in the knife until the shoulder of the head bears against one side of the knife. A nut 160, in the form of a sleeve threaded internally, is then screwed upon the projecting threaded shank until the body of the knife is gripped between said sleeve and the head of the bolt.

As shown in Fig. 29, the structure then presents the appearance of a pin projecting equally on each side of the knife. These pins extend into inclined slots 161, formed in the bottom walls of recesses 162, located on opposite sides of the knife slot 153 in the body of the roll 142. The knife is provided with a projection 163 on its back, which is acted on by a spring to throw the knife outward into cutting position, while the end 164 of the knife projects beyond the body of the roll, to be acted upon by a cam to move the knife inward against the action of said spring. The spring, indicated by the reference numeral 165, is coiled upon the shaft 143, which is reduced for a portion of its length to form a shoulder 166, against which one end of the spring abuts. The other end of the spring abuts against a thrust collar 167, fitted to slide longitudinally on the shaft, its movement being limited by a stop pin or projection 168. The shaft is slotted longitudinally at 169, as indicated in dotted lines in Fig. 27, and the projection 163 on the knife extends into this slot in the path of the collar 167, which bears against it. Thus the spring 165 constantly tends to move the knife to the left with respect to the roll, in the position of the roll shown in Fig. 23, and the inclination of the slots 161 is such that this movement of the knife to the left causes it to project outward beyond the body of the roll 142, so as to enter the slot 140 of the coöperating roll 137, and thereby sever the paper. As already stated, the paper is held firmly gripped on each side of the line of cut during this operation by the gripping projections 141 and 154, so that the cut is effective. Moreover, the movement of the knife is diagonal, giving a draw cut, which is desirable. The position of the knife at the time when it is projected from the roll to act, and withdrawn into the roll when not acting, is determined by a fixed cam 170, secured to one of the bearings of the shaft 143, in a position such that the projecting end 164 of the knife is held against said cam by the action of the spring 165. The cam is of a shape such as to project the knife and sever the web at the proper moment. Simultaneous motion is imparted to both pairs of feed rolls from a gear 171, which meshes with the gears 146 and 128 of the two lower rolls, and which is itself driven by means of a bevel gear 172, formed on its inner face and meshing with a bevel pinion 173 on the upper end of a vertical shaft 174, mounted in bearings 175 on the bracket 112. This shaft has at its lower end a bevel gear 176, meshing with a similar gear 177 on a shaft 178, extending to the front of the machine and having there a bevel gear 179, driven by a bevel gear 180 on the shaft 58.

After passing the feeding rolls, the paper travels between guides 181 and 182 above and below the same, the severed sheets being drawn along by means of traveling gripping jaws which engage the leading edge of the sheet and carry it positively away from the rolls. The operating mechanism of these gripping jaws comprises a shaft 183, mounted in suitable bearings in the members 114, and having a gear 184 at one end, which meshes with the gear 129. The other end of the shaft 183 is provided with a crank 185, to which is pivoted one end of a connecting rod 186. The other end of said connecting rod is pivoted to a bar 187, which slides longitudinally in guides 188, mounted on one of the members 114. The connecting rod 186 is pivoted to the rear end of the slide-bar 187, and the forward end of said slide-bar is deflected inward, as shown at 189, and is provided with bearings 190, in which are mounted the shafts 191 and 192 of the gripping jaws 193 and 194. These shafts are provided respectively with intermeshing gears or gear segments 195 and 196, so that the gripping jaws move simultaneously toward and from each other.

The shaft 191 of the upper gripping jaw has secured thereto, on the end thereof opposite to that on which the gripping jaw 193 is mounted, an arm 197, provided at its free end with a laterally extending pin 198. A coiled spring 199 has one of its ends connected to the pin 198, its other end being secured at 200 to the slide-bar 187. The arrangement of the connections of the ends of this spring is such that it acts either to hold the gripping jaws open, as shown in Fig. 21, or to hold them closed, according to which side of the center of the shaft 191 said spring lies upon. In other words, the spring is neutral when the connection 200, shaft 191 and pin 198 are in alinement. When the pin 198 moves downward from this position, the spring forces the jaws open, and when the pin 198 moves upward from this alinement, the spring forces the jaws closed. The movements of the pin 198, and, consequently, the opening and closing of the jaws, are determined by two fixed cams, 201 and 202, located in the path of the pin 198. As the slide-bar 187 moves to the left in Figs. 15 and 16, with the gripping jaws open, and approaching the edge of the paper, the pin 198 strikes the inclined cam 201 on the upper side thereof, and said pin is moved upward until it passes beyond the line passing through the connection 200 and shaft 191, whereupon the spring 199 snaps the gripping jaws together with the forward margin of the paper between them. The knife having operated to sever the web, the direction of the travel of the slide-bar is reversed, and the gripping jaws move in the opposite direction, carrying with them the severed sheet. As the slide-bar approaches the limit of its movement in this direction, the pin 198 comes into contact with the under surface of the inclined cam 202, and said pin is forced downward until it reaches a position where the spring 199 acts upon it in such a way as to throw open the gripping jaws, thereby releasing the sheet of paper at the end of the stroke of the gripping jaws, which latter then returns to grip the next sheet and carry it to its destination.

The carrying movement of the gripping jaws just referred to is a movement toward the center of the machine, where the confections are delivered, and where the initial operations of bringing together the confection and wrapper and wrapping the former within the latter are performed. The movements of the candy-feeding and paper-feeding mechanisms are so timed that the wrapper is delivered in position for wrapping just before the confection is so delivered. The action of the wrapping mechanism serves to withdraw the wrapper from the path of the returning gripper by reason of the fact that the plunger, hereinafter described, forces the wrapper sheet downward between the lower guides, thereby drawing the lateral marginal portions thereof inward and leaving them upstanding.

The shaft 178 is provided with a clutch 178$^a$, controlled by a lever 178$^b$, by means of which clutch the paper-feeding mechanism may be stopped and started independently of the rest of the machine, thereby avoiding the wasting of paper during the time between the starting of the candy from the batch and the arrival of the first confection at the wrapping mechanism.

*Wrapping mechanism.*—The wrapping mechanism is organized with a special view to speed in wrapping as well as accuracy, so that the output of the machine may be largely increased. To this end, the confections, with their wrappers folded around them, are directed alternately in two different paths, and duplicate groups of handling and twisting mechanism are employed, so that one set of twisting mechanism will be operating to twist the ends of the wrapper of a confection while the other set of twisting mechanism is returning to its original position to operate on the next confection. In this way, the machine is always twisting a confection, instead of being idle during one-half of the time, two wrapped confections are delivered for each complete cycle of the wrapping mechanism, instead of one, and the output of the machine is doubled.

Referring now more in detail to the wrapping mechanism, it should be noted that the same is located between the candy-feeding and confection-forming mechanism on one side of the machine and the paper-feeding mechanism on the other side. The frame 1 has two parallel longitudinal members 203, having a lower set of guideways 204, in which travels a slide 205, and an upper pair of guideways 206, in each of which travels a slide 207. These slides 205 and 207 are so actuated as to move simultaneously in opposite directions, their movements being preferably effected in the manner illustrated. The crank shaft 62 is provided with a crank pin 208 on the rear face of the gear 64, to which crank pin there is connected one end of a connecting rod 209, the other end of which is connected to the slide 205, as indicated at 210. The crank shaft 66 is provided at each end with a crank arm 211, to the crank pin 212 of which there is pivoted one end of a connecting rod 213. The connecting rods 213 have their other ends pivoted at 214 to the slides 207, which latter move in unison, and constitute practically a single slide, moving in a direction opposite to the slide 205. About midway of their length the longitudinal members 203 are connected by a bridge or support composed of a lower plate 215, supported on abutments 216, and an upper plate 217, supported above the plate 215 by interposed spacing pieces 218, so as to leave between the plates a space 219, open at each end toward the ends of the machine. On the plate 217 there is mounted a standard 220, which extends upward above the same and serves as a guide for a vertically-acting plunger 221. To this end, the upper end of the standard 220 is provided with parallel flanges 222, supporting pairs of guiding rollers 223, between which the plunger 221 fits and is guided. Movement is imparted to the plunger 221 by means of a cam plate 224, supported by arms 225 from one of the slides 207 and passing through a slot 226 in the plunger 221. The cam plate 224 is provided with a cam slot 227, having a straight or horizontal central portion 228, and downwardly inclined end portions 229 and 230. The plunger 221 is provided with a roller 231 which fits the cam slot 227, and by its engagement therewith serves to raise and lower the plunger at the proper times. The plunger is provided with a detachable foot, which serves, among other purposes, as a stop to arrest each confection as it is delivered from the conveyer belt 104, as illustrated more particularly in Fig. 35. To this end the plunger foot, indicated as a whole by the reference numeral 232, is provided with a downwardly projecting lip or flange 233 at the end thereof farthest from the conveyer 104. The confection, as it is delivered to the wrapping mechanism, is arrested by contact with the stop 233, and comes to rest immediately underneath the plunger foot 232, as shown in Fig. 35. As already stated, the plunger foot is removable to give access to the confection, wrapper, and underlying parts when necessary, and to this end the plunger is provided at its lower end with grooves 234 on each side thereof, the plunger foot being provided with corresponding grooves in its upper side to receive the lower end of the plunger, and ribs or projections 235 to fit the grooves 234. The foot is provided on its rear side with a handle or finger grasp 236, by means of which it can be readily slipped on and off the plunger from the rear side thereof, and, in order to lock the foot in position on the plunger, said foot is provided with an upward extension 237, which engages under a plate 238, mounted to slide vertically on the rear edge of the plunger, being provided for this purpose with slots 239, through which pass screws 240 threaded into the plunger. By sliding the plate 238 upward, the locking projection 237 is disengaged, and the plunger foot may be withdrawn. This construction is shown in detail in Figs. 35 and 37.

The plunger is provided at its lower end with folding plates 241, located one on each side thereof and extending below the lower face of the plunger foot to a distance somewhat greater than the height or thickness of the confection. These plates are separated from each other by a distance which is slightly in excess of the width of the confections, as shown in Fig. 37. The plates 241 are notched at their lower edges, as indicated at 241ª, to receive the gripping fingers 279, hereinafter referred to, when said plates are depressed. It will be understood that the severed sheet of paper which is to constitute the wrapper is fed forward by the gripping fingers into the position shown in Fig. 35, the wrapper being indicated by the reference numeral 242 and the confection by the reference numeral 243. The sheet is supported along its lateral margins by the guides 181 and 182, between which it rests, and it will be noted that, for convenience of construction, the place of one of the lower guides 182 is occupied and its function accomplished by the marginal portion of the base 244 of the standard 220. The upper bridge plate 217 is provided with a slot 245, having a length at least equal to the length of the wrapper 242, and a width slightly greater than the width of the plunger between the outside surfaces of the folding plates 241, being about equal to the distance separating the two pairs of guides 181 and 182 on the opposite sides of the plunger. In the space between said guides there is located a support 246, mounted on the upper end of a stem or shank 247, which moves vertically in alinement with the plunger 221. This stem is guided at its lower end by means of an apertured lug 248 on a casting 249, secured to the main frame 1. About midway of its height there is secured to the stem 247 a plate 250, which slides in guideways 251, mounted on the upper end of an upright 252, secured at its lower end to the casting 249 and extending upward through a slot 253 in the slide 205. This stem and supporting plate are pressed upward by means of a spring 254, coiled around a stud shaft 255, projecting from the casting 249. On this stud shaft there is loosely mounted an arm 256, which is acted on by the spring 254, and which has pivoted to its free upper end one end of a link 257. The other end of the link 257 is pivoted to a clip 258, secured to the stem 247. The lower end of the stem 247, below the lug 248, is provided with nuts 259 and cushioning washers 260, by means of which the limit of upward motion of the support 246 may be adjusted and through which any shock or jar is avoided when the said limit is reached.

As shown in Figs. 34 and 35, the support 246 is preferably somewhat longer than the confection, while its width, at least at its central portion, is made somewhat less than the width of the confection, it being preferably cut away on each side, as indicated at 261. The lower bridge plate 215 is provided with an aperture 262, to receive the support 246 when it is depressed in the manner hereinafter described. The vertical movements of the support 246 are controlled in part by the movements of the plunger 221, and in part by a cam plate 263, secured on the slide 205. The cam plate has a large opening 264 formed through it at each end, while its central portion is occupied by a body 265, shown in dotted lines in Fig. 37, which body cuts off any connection between the two open end portions 264 of the cam slot at the top thereof, leaving a passage 266 at the lower portion thereof. The ends of the body 265 are rounded off, as indicated at 267. On the outer face of the body 265 there is mounted a plate 268, which extends beyond the body in each direction, and is provided at each end with a bearing sleeve 269, in which is mounted the shaft or journal 270 of a switch 271, lying within the cam groove at each end of the passage 266. These switches are forced normally downward into the position shown by means of springs 272, which bear upon pins 273, which project from the shafts or journals 270 through slots 274 in the bearing sleeves 269. The slide 250 is provided with a roller 250ᵃ which travels in the slot of the cam plate 263.

On the under side of the lower bridge plate 215 there is secured a bracket 275, from which extend downward guideways 276, in which there is mounted to slide vertically a plate or slide 277. This plate has pivoted to its front face, at 278, the lower ends of two upwardly extending gripping fingers 279, which extend up through the slot 262 in the lower bridge plate 215, projecting normally into the space 219. These fingers are held normally in the position shown by a spring 280, coiled around the projecting end of a rod 281 which connects the gripping fingers, the tension of the spring being adjusted by a thumb nut 282. The position of the slide 277 and gripping fingers 279 is controlled by a cam plate 283 secured to the slide 205 and having a cam groove 284, in which engages a roller 285, mounted on a bearing stud 286, projecting from the rear of the slide 277. The cam plate 283 also serves to transmit motion from the slide 205 to a tucker 287, mounted to slide in the space 219 in a direction lengthwise of the machine and at right angles to the direction in which the confections and wrappers are fed to the wrapping mechanism. To this end there is secured to the upper edge of the cam plate 283 a plate or standard 288, which extends up through a slot 289 in the lower bridge plate 215 and is secured to the under side of the tucker 287, so as to cause this latter to move in unison with the slide 205. The lower bridge plate 215 is provided on its upper side with a way 290, upon which the tucker fits, as shown in dotted lines in Fig. 35, so as to be properly guided in its movements. The tucker is provided on its upper surface with folding flanges 291, which project beyond the body of the tucker on both sides in the direction of its travel. These flanges, and the body of the tucker, are slotted vertically along their opposite margins, as shown at 293, to accommodate the rake teeth hereinafter referred to.

The wrapping mechanism, so far as it has been now described, serves to fold the wrapper around the confection and present the package in this condition to the twisters by which the ends of the wrapper are twisted. I will therefore described the operation of this portion of the mechanism before proceeding to describe the twisters and their mode of operation. Assuming that the parts are in the position shown in Figs. 34, 35 and 37, the wrapper has been delivered between the guides 181 and 182, resting on the guides 182 and support 246, and a confection has just been delivered, resting on the wrapper and supported by the support 246. The slides 205 and 207 are moving in opposite directions, as indicated by the arrows in Fig. 37, and the roller 231 of the plunger 221 is engaged by the inclined portion 230 of the cam slot 227 in the cam bar 224 at the top of the machine, which is actuated by the slide 207. The plunger 221 thereupon moves downward, and the folding plates 232 carried thereby pass down on each side of the confection until they come into contact with the wrapper as it rests upon the support 246. Further downward movement of the plunger 221 depresses the support 246 against the action of the spring 254, at the same time firmly gripping the wrapper against the support along the first lines of fold, which folds are formed by the lower guides as the wrapper is carried down between them, and also by the side walls of the slot 245 in the upper bridge plate 217. This downward movement continues until the upper surface of the support 246 is level with or below the upper surface of the lower bridge plate 215, whereupon it ceases. During the latter portion of the downward movement of the parts, the confection is gripped through its wrapper between the gripping fingers 279, the cutaway portions 261 at the sides of the support permitting the fingers to grip the confection.

which is held between them by the tension of the spring 280. The cam plate 263 does not interfere with this downward movement of the support 246 under the influence of the plunger 221, since the roller 250ª is engaged in the open end portion 264 of the cam slot in said plate and is therefore free to move downward. The cam plate 283 holds the gripping fingers 279 against vertical movement by reason of the engagement of the roller 285 of the slide 277 in the straight or horizontal end portion of the cam slot 284. When the slides reverse the direction of their travel, the plunger 221 moves upward, but the confection is prevented from being carried upward by said plunger, in case it should happen to adhere to the same, by reason of its being gripped between the fingers 279. The support 246 is prevented from following the plunger 221 upward by reason of the fact that the point of connection of the link 237 with the stem 247 of said support passes below the point of connection of said link with the spring-actuated arm 256, and when the parts are in this position, it is obvious that the spring 254 will act to force the said stem and support downward and hold them in such depressed position. As the cam plate 263 advances, the roller 250ª passes under the switch 271, which yields upward to permit it to pass, and into the portion 266 of the cam slot, which serves to act as an additional safeguard for preventing upward movement of the support during this portion of the operation of the machine. The tucker 287 is now approaching the confection which lies in its path, but before the tucker reaches it, the gripping fingers 279 are drawn downward out of its path, at the same time releasing the confection, by reason of the engagement of the roller 285 with the downwardly inclined portion of the cam grooves 284 in the cam plate 283. The projecting edge 291 of the tucker first engages the vertically upstanding portion of the wrapper on the side which the tucker is approaching, and folds said upstanding portion down on the top of the confection before or as the body of the plunger comes into contact with the confection. As the tucker advances, its body engages the body of the confection and pushes it before it into the space 219 between the upper and lower bridge plates 215 and 217 to the left of Fig. 37. This action causes the upper bridge plate to fold the other upstanding margin of the wrapper down on top of the confection and on top of the other wrapper margin first folded down by the projecting edge 272. The tucker passes beyond and clear of the slot 262 in the lower bridge plate 215, and when it has done so, the roller 250ª comes into contact with the switch 271 at that end of the cam plate 263 and is forced upward between said switch and the rounded end 267 of the body 265 of said cam plate. This upward movement of the roller 250ª carries with it the support 246 and its stem 247 against the action of the spring 254, until the pivotal connection of the link 257 with said stem has passed above the pivotal connection of said link with the arm 256, whereupon the spring 254 acts upon the support and its stem in the opposite direction, and serves to lift them upward to their original or normal position. At the same time, the cam groove 284, acting on the roller 285, moves the slide 277 upward, and brings the gripping fingers 279 back to their normal position, ready to grip the next confection. In the meantime, a second wrapper sheet and a second confection have been fed into position below the plunger 221, and said plunger, the support, and the gripping fingers are all in their normal position, the tucker being on the other side of their path, however. The completion of the motion of the two slides in the direction now under consideration moves the plunger 221 downward by reason of the engagement of the roller 231 with the inclined portion 229 of the cam groove 227 at the other end of the cam bar 224. The same series of operations just described again take place, the confection being carried downward by the depression of the support 246, and the lateral margins of the wrapper being left upstanding, while the confection is engaged by the gripping fingers 279. At this point, the slides again reverse their motion, moving once more in the direction indicated by the arrows in Fig. 37, and the plunger 221 rises, while the tucker 287 approaches the second confection from the other direction. The operation is the same as that already described, except that the other half of the cams 224, 263, 283 now controls the movements of the parts, and the tucker first folds the margin of the wrapper to the left of Fig. 37, the other margin being folded as the tucker pushes the confection and wrapper from the path of the plunger to the right of Fig. 37. A confection thus partially wrapped is shown to the extreme right of Fig. 37, with the tucker still pushing it forward and approaching the limit of its movement in that direction.

In connection with the plunger it will be noted that, as in my prior application, Ser. No. 149,681, the plunger is a hollow plunger, by reason of the hollow or recess formed in its foot between the plates 241, so that, while the confection and wrapper are conveyed downward to the folding mechanism, the plunger does not press upon the confection, which latter is supported from below.

The lower bridge plate 215 is provided on each side with a lateral extension or arm 294, and the upper bridge plate 217 is similarly provided on each side with an arm 295, lying above and extending somewhat beyond the arm 294. The construction is the same on each side of the plunger 221, so that the description of one of these mechanisms applies equally to both. Each arm 295 is provided with a longitudinal vertical slot 296, to receive the central tooth of the coöperating rake. Each arm 225 has a downwardly extending support 297, to the lower end of which is pivoted one end of a rake arm 298. The construction which I prefer for this purpose is that shown, in which the support 297 is provided with two lugs 299 at its lower end, to receive between them the ends of the rake arm 298, which is connected thereto by a pivot bolt 300. The pivot bolt is extended on one side to form a support for a spring 301, coiled around said extension and connected thereto at one end, while its other end bears upon the top of the rake bar 298, to press the same downward. At its other or free end, the rake bar 298 carries a rake 302, comprising a central finger or tooth 303, which extends downward through the slot 296 in the upper arm 295 and is normally held against the upper surface of the lower arm 294 by the spring 301. Said rake also comprises lateral fingers or teeth 304, which lie on each side of the arms 295 and 294 and therefore close the space between said arms at the sides thereof. At the inner end of the slot 296 there is located on top of the arm 295 a switch cam 305, pivoted to its support at its inner end, as indicated at 306, and held normally in the position shown by means of a spring 307. This switch cam has at its outer free end a lifting incline 308, which lies in the path of a pin or projection 309, carried by the rake. When the rake is moving inward, the pin 309 rides up on this incline 308, and lifts the rake so as to enable it to pass over and back of the wrapped confection which has just been pushed out on that side by the tucker 287. The switch cam is recessed or cut away near its pivot, as indicated at 310, so as to permit the rake to move downward back of the confection when the pin 309 reaches the recess 310. A fixed guide 311 is provided with an inclined cam surface which insures the downward movement of the rake by reason of its engagement by the pin 309. As already stated, the shuttle is provided with vertical slots or grooves 293, which receive the rake fingers and permit them to pass downward back or inside of the confection lying in front of the shuttle. The switch cam 305 is provided, on the longitudinal face thereof adjacent to the slot 296, with a cam incline 312, which lies in the path of the pin 309, so that, during the outward movement of the rake, the switch cam 305 is pushed to one side, against the pressure of the spring 307, to permit the rake to move outward without rising. These rakes and their coöperating mechanisms and parts constitute conveying mechanisms whereby the confections, with the wrappers folded around them, are carried off in opposite directions alternately, and it is during the time when these conveyers are operating upon the confections that the ends of the wrappers are twisted. The conveyers operate alternately, in the sense that one is actually conveying outward a confection while the other is returning for the next confection, and since one of the conveyers is always thus engaged in actual work, and the twisters coöperating therewith are simultaneously twisting, it will be seen that one set of these devices is always doing useful work. It will be further noted that the confection is held from turning and guided between the arms 294 and 295, which lie below and above the same while it is being drawn along by the fingers of the rake 302, and it will be understood that when the confection starts upon its outward movement, the untwisted ends of the wrapper project on each side of the arms 294 and 295, in position to be grasped by the twisters.

In connection with each rake 302 there are employed two twisters, lying respectively on opposite sides of the arms 294 and 295, and carried by the corresponding ends of the two slides 207. Each slide 207 therefore carries two twisters, one at each of its ends, all four twisters moving in unison with the two slides. The construction of all the twisters is the same, and a description of one will therefore apply to all. Each twister comprises a support or bracket 313, mounted on the upper side of the slide 207, and having bearings 314, in which is mounted to rotate and slide longitudinally the twister shaft 315. This shaft is provided at its outer end with a head 316, in which is mounted an antifriction roller 317, having its axis of rotation at right angles to the shaft 315. Said head also comprises a thrust collar 318 and bearing collar 319, which latter receives a non-rotating collar 320, which is held against the thrust collar 318 by spring pressure, so that the normal tendency of the shaft 315 is to move outward. To effect this spring pressure I prefer to employ an arm 321, having forked ends 322 to engage pins 323 on the collar 320. The arm 321 is pivoted on a standard 324, arising from the bracket 313, and a spring 325, coiled around said standard, acts on the arm 321 to move its free end normally outward. At its other or inner end the shaft 315 is provided with a head 326, slotted transversely as indicated at 327, and in this slot there are pivoted, at 328, the inner ends of the twisting fingers 329. On this inner end of the twister shaft there is mounted so as to rotate therewith and slide longitudinally thereon a second head 330, constituting the controlling head for the twisting fingers. The head 330 is shouldered at 331 to engage the head 326, and is slotted, as indicated at 332, for the passage of the twisting fingers 329. On each side of each slot 332 are located lugs 333, which support a pin 334, said pin passing through a slot 335 in the body of the corresponding twisting finger. Thus relative movement of the heads 330 and 326 in one direction will open or separate the twisting fingers, while relative movement of said heads in the opposite direction will bring them together and cause them to grip the ends of the wrapper. Preferably, the gripping jaws of the twisting fingers are constructed in the manner shown, one being convex, as indicated at 336, and the other concave, as indicated at 337, in order to better grip the wrapper and give its extremity the desired finish after twisting.

The movements of the head 330 are preferably controlled in the following manner. The head 330 is reduced in diameter at that end thereof nearest the bracket 313, as indicated at 338, and on the extremity of this reduced portion there is secured a collar 339, thereby forming between the body of the head and said collar a groove 340, in which is mounted a non-rotating collar 341. This collar has projecting therefrom pins 342, which are embraced by the forked ends 343 of a lever 344, pivoted on a standard 345, arising from the bracket 313. The lever 344 is centrally pivoted at 345, and has another arm or plunger, extending over the slide 207, which is provided with an aperture 346; while the lever 344 has a downwardly projecting stud 347, which passes through said aperture and engages with a cam slot 348 in a fixed cam plate 349, located below the slide 207. The cam slot 348 is so shaped as to give the desired movement to the head 330 in the manner hereinafter described.

The twister shaft is rotated by means of a rack bar 350, each slide 207 having a continuous rack bar located above the same and provided with rack teeth on its under side at each end, so that the two twisters at the ends of each slide are operated from a common rack bar. Each twister shaft 315 is provided with a gear 351, carried by a sleeve 352, splined on the shaft 315 and fitting between the bearings 314, so that the gear and shaft rotate in unison, while the shaft is free to slide longitudinally with respect to the gear. Each rack bar 350 is provided at each end with a projection or stop 351$^a$, and has pivoted to each extremity a link 352$^a$, the free end of which is slotted, as indicated at 353. These links connect the ends of the rack bar to tensioning arms 354, located at each end of each rack bar. Each arm 354 has at its free end a pin 355, engaging the slot 353, while its other end is pivoted on a standard 356, arising from the main frame of the machine. A spring 357, coiled around the standard and engaging the arm 354, tends to move the same in the direction indicated by the arrow in Fig. 38, so that the tension arms 354 at the two ends of each rack bar tend to move in opposite directions and maintain a pull or tension upon said rack bar. The movement of each arm is limited, however, in any suitable manner, preferably by means of a stud 358, extending outward from the standard 356 through a slot 359 in the hub of the arm 354. The bracket 313 carries a projection or stop 360, which coöperates with the stop 351$^a$ at the corresponding end of the rack bar.

Assuming that the confection has been delivered to the rake at either side of the machine, ready for twisting, the twisters on that side of the machine will then be located near the central point of the wrapping mechanism, separated as far as possible, and with the twisting fingers open, as indicated in full lines in Figs. 41 and 42. As the confection is carried outward by the rake, the slides 207, moving in the same direction, carry the twister brackets along with them in their movement. By reason of the engagement of the stud 347 at one end of the lever 344 with the cam slot 348 of the fixed cam plate 349, the extremities 343 of the two levers 344 of the two twisters are caused to move toward each other, thereby moving the twister heads 330 toward each other and longitudinally with respect to the twister shafts 315 and their heads 326, which are still held against longitudinal movement by the spring-controlled arms 321. This initial movement of the heads 330 toward each other causes the twisting fingers to move into the position shown in dotted lines in Fig. 42, and to grasp between them the projecting ends of the wrapper on each side of a confection. During this period, the rack bars move in unison with the twisters, and the twister shafts are therefore prevented from rotating, causing the twisting fingers to grip the paper properly and in such a way as to effectively hold the ends of the wrapper during the subsequent twisting operation. The rack bars 350 then become stationary, and the twister shafts are therefore caused to revolve, and to thereby twist the ends of the wrapper, the confection being held against rotation between the arms 294 and 295. As the twisting operation proceeds, the wrapper becomes correspondingly shortened, and in order to prevent tearing of the wrapper as it shortens, the twisters are moved toward each other during the twisting operation. This movement is also effected by the cam slots 348, which, acting on the levers 344, cause their ends 343 to gradually approach each other. Since the heads 330 are now in engagement with the heads 326, the two heads will move in unison toward each other, sliding the twister shafts 315 toward each other in their bearings against the action of the spring-controlled arms 321. This operation continues until the twisting is completed, and it will be understood that the twisters travel along with the confection and its conveying mechanism, the latter moving the confection along, while the former maintain their position so as to twist the ends of the wrapper while the confection and wrapper are traveling to the point of delivery. When the twisting is completed, the twisting fingers are caused to release their grip by reason of the cam slots 348 acting on the levers 344 to move their ends 343 away from each other.

To prevent the twister shaft head 326 from following the head 330 under the influence of the spring-controlled arm 321 and thereby preventing the opening of the twisting fingers, I provide a fixed contact cam 361 at the side of the machine, with which the roller 317 at the end of the twister shaft 315 engages, thus preventing outward movement of the shaft 315. During this contact, it is necessary to prevent the shaft 315 from rotating, and to this end the tension arms 354 and their coöperating mechanisms are provided. When the twisting fingers open, the stop or projection 360 of each working twister head comes into contact with the coöperating stop or projection 351ª on the rack bar 350, and the stops 351ª are held against the stops 360 by means of the tension arms 354 at the farther end of the rack bars, so that the relations of said rack bars and twister heads are fixed during the latter portion of the movement of the twister heads. This fixity of relation occurs when the shaft 315 is in the position shown, for instance, in Fig. 34, with the roller 317 lying in a horizontal plane, in which position it is maintained as it travels along in contact with the cam 361.

It will be seen that the rack bars move in unison with the twisters during the concluding portions of their stroke in each direction, and, by reason of the slots 363 at the ends of the links 352ª, the same is true of the initial portion of the stroke in each direction, the rack bars always being held under tension at one end or the other. By reason of this fact, the twisters do not rotate during the initial portion of their outward travel, while they are engaged in closing their fingers upon the ends of the wrapper, and said fingers also remain open during a considerable portion of their outward stroke at the end thereof, in order to permit free discharge of the confection and prevent said fingers from interfering therewith.

The completed wrapped confection, after the twisters have been disengaged and withdrawn therefrom, is carried by the rake 302 outward past the end of the arms 294, from which it falls into a suitable receptacle. The slides 207 then reverse the direction of their movement and the twisters and rakes on the side of the machine just under consideration return to operate upon the confection next delivered to them, while the twisters and the rake on the other side of the machine are conveying to the other discharge point the succeeding confection, and at the same time twisting the ends of its wrappers.

It will be observed that by the provision of a double set of twisting mechanisms the capacity of the machine is very largely increased, and the slowness of the output, heretofore caused by the fact that the forming and folding mechanisms had to wait upon the slower action of the twisters, is entirely done away with, and the speed of the machine correspondingly enhanced. It will be further observed that the two twisters which twist the opposite ends of a given wrapper rotate in the same direction, so that the ends of the wrapper are twisted in the same direction. The direction of this twist is the same as the direction of the folding of the body of the wrapper around the confection, so that the twisting tends to hold the wrapper more firmly around the body, and makes a tight package with comparatively little overlap, and these results are not obtainable when the ends are twisted in opposite directions. Furthermore, the package thus formed can be readily and quickly opened by pulling the ends of the wrapper in opposite directions, as this tends to untwist the ends and open up the body of the wrapper.

It will be understood, of course, that although the wrapping mechanism just described is designed primarily for use in wrapping confections, and more particularly for use in an organized machine for automatically forming confections from a batch of candy and delivering them wrapped for the market, said wrapping mechanism is also capable of use in other connections, and for the purpose of wrapping articles and things other than confections.

*General operation.* The general operation of the machine will be readily understood from the preceding descriptions of the construction and operation of its constituent mechanisms, and therefore requires no detailed description here. It will be seen, however, that the machine is so organized that when it is provided with a suitable batch of candy and a suitable roll of wrapping paper, the machine, when properly started, will proceed to automatically form from the batch, temper and size the confections, cut and deliver the wrappers, and wrap the confections therein, delivering them ready for the market or for packing at a rapid rate in neat and attractive form.

It will be understood, of course, that all of the features hereinbefore described need not necessarily be embodied in a single machine, as portions of the mechanisms may be dispensed with under certain circumstances. It will also be understood that various details of construction may be modified without departing from the broader principles of my invention as specified in the claims hereto annexed.

I make no claim in this present application to any of the subject matter herein disclosed which is claimed in my prior pending applications hereinbefore referred to, to wit, my application filed March 26, 1903, Ser. No. 149,681, and my application filed Dec. 23, 1903, Ser. No. 186,282.

Having thus fully described my invention, what I claim as new and desire to secure by Letters Patent is:—

1. A machine for forming and wrapping confections, comprising a support for a batch of candy, forming rolls for forming the candy into a bar, automatic means for mechanically drawing the candy from the batch and delivering it to the forming rolls, cutting mechanism for severing the confections from the bar formed by the forming rolls, wrapping mechanism for automatically wrapping the confections, and means for automatically conveying the confections from the cutting mechanism to the wrapping mechanism, substantially as described.

2. A machine for forming and wrapping confections, comprising a support for a batch of candy, said support consisting of an automatic batch diminisher which delivers the candy from the batch in the form of a continuous body of diminished size, forming rolls for forming the candy into a bar having the cross sectional area of the finished confection, automatic means for mechanically drawing the candy from the batch diminisher to the forming rolls and progressively reducing its diameter, cutting mechanism for severing the confections from the bar formed by the forming rolls, wrapping mechanism for automatically wrapping the confections, and means for automatically conveying the confections from the cutting mechanism to the wrapping mechanism, substantially as described.

3. A machine for forming and wrapping confections, comprising a support for a batch of candy, forming rolls for forming the candy into a bar, automatic means for mechanically drawing the candy from the batch and delivering it to the forming rolls, cutting mechanism for severing the confections from the bar formed by the forming rolls, wrapping mechanism for automatically wrapping the confections, and means for automatically conveying the confections from the cutting mechanism to the wrapping mechanism, said conveying means comprising a tempering conveyer, substantially as described.

4. A machine for forming and wrapping confections, comprising a support for a batch of candy, forming rolls for forming the candy into a bar, automatic means for mechanically drawing the candy from the batch and delivering it to the forming rolls, cutting mechanism for severing the confections from the bar formed by the forming rolls, wrapping mechanism for automatically wrapping the confections, and means for automatically conveying the confections from the cutting mechanism to the wrapping mechanism, said conveying means comprising a tempering conveyer, and sizing rolls for sizing the tempered confections, substantially as described.

5. In a candy machine, a batch support and diminisher comprising a conical or tapering receptacle arranged at an angle to the horizontal, open at its ends, and having a body composed of longitudinal sections, and means for moving said sections to alternately decrease and increase the size of the receptacle, substantially as described.

6. In a candy machine, a batch support and diminisher comprising a conical or tapering receptacle open at its ends and having a body composed of longitudinal sections, and means for moving said sections toward and from the central line of the receptacle, substantially as described.

7. In a candy machine, a batch support and diminisher comprising a conical or tapering receptacle open at its ends and having a body composed of longitudinal sections, the alternate sections being resilient and bearing against the inner faces of the adjacent sections, and means for simultaneously moving said sections toward and from the central axis of the receptacle, substantially as described.

8. In a candy machine, a batch support and diminisher comprising a conical or tapering receptacle open at its ends and having a body composed of four longitudinal sections, arranged in opposite pairs, one pair of said sections being resilient and bearing at their margins against the inner faces of the other pair, and means for simultaneously moving said sections toward and from the central axis of the receptacle, substantially as described.

9. In a candy machine, a batch support and diminisher comprising a tapering or conical receptacle open at its ends and having a body composed of longitudinal sections arranged in opposite pairs, two of said sections being pivotally supported at their smaller ends, a frame located at the larger end of the receptacle, four shafts arranged in said frame at right angles to each other, geared to operate in unison, and having actuating arms connected to the respective sections, means for oscillating one of said shafts, and toggle links connecting the smaller ends of said sections, substantially as described.

10. In a candy machine, a batch support and diminisher comprising a tapering or conical receptacle open at its ends and having a body composed of longitudinal sections arranged in opposite pairs, two of said sections being pivotally supported at their smaller ends, a frame located at the larger end of the receptacle, four shafts arranged in said frame at right angles to each other, geared to operate in unison, and having actuating arms connected to the respective sections, means for oscillating one of said shafts, and toggle links connecting the smaller ends of said sections, in combination with means for guiding the smaller ends of the sections intermediate the pivotally supported sections, substantially as described.

11. In a candy machine, a batch support and diminisher comprising a conical or tapering receptacle arranged at an angle to the horizontal, having a body composed of longitudinal sections, and provided with means for simultaneously moving said sections in and out to alternately compress and release the batch of candy, substantially as described.

12. In a candy machine, a batch support and diminisher comprising a conical or tapering receptacle arranged at an angle to the horizontal, having a body composed of longitudinal sections, and provided with means for simultaneously moving said sections in and out to alternately compress and release the batch of candy, in combination with a plurality of pairs of feeding and drawing rolls arranged to successively receive the candy as it comes from the diminisher, said pairs of rolls having successively decreasing passes and increasing peripheral velocity, substantially as described.

13. In a candy machine, a batch support and diminisher constructed and arranged to alternately compress and release the batch of candy, intermittently rotating forming rolls, and means for drawing the bar of candy from the diminisher to the forming rolls, in combination with means for simultaneously operating said batch diminisher and forming rolls, substantially as described.

14. In a candy machine, the combination, with means for supporting a bar of candy in horizontal position, of confection forming mechanism comprising a pair of intermittently rotating horizontal feeding rolls located adjacent to the discharge end of the support, side plates located between said rolls, a tube extending downward from the rolls, a housing supporting said forming mechanism and pivoted to swing up to give access to the cutter, and a cutter moving across the lower end of the tube when the rolls are stationary, substantially as described.

15. In a candy machine, the combination, with means for supporting and intermittently feeding forward a bar of candy, of a rotating part mounted adjacent to the path of the bar, a disk cutter eccentrically mounted in said rotating part and projected across the path of the bar by its eccentricity when the bar is stationary, and means for positively rotating said disk cutter relatively to the part in which it is mounted, substantially as described.

16. In a candy machine, the combination, with means for supporting and intermittently feeding forward a bar of candy, of a rotating part mounted adjacent to the path of the bar, a disk cutter eccentrically mounted in said rotating part and projected across the path of the bar by its eccentricity when the bar is stationary, and means for positively rotating said disk cutter in a direction opposite to the direction of rotation of the part in which it is mounted, substantially as described.

17. In a candy machine, means for supporting and intermittently feeding forward a bar of candy, in combination with a hollow shaft arranged parallel with the path of the bar, means for rotating said hollow shaft, a mandrel eccentrically mounted in said hollow shaft and provided with a disk cutter adapted to be projected across the path of the bar when the latter is stationary, and means for rotating said mandrel independently of the shaft in which it is mounted, substantially as described.

18. In a candy machine, means for supporting and intermittently feeding forward a bar of candy, in combination with a hollow shaft arranged parallel with the path of the bar, means for rotating said hollow shaft, a mandrel eccentrically mounted in said hollow shaft and provided with a disk cutter adapted to be projected across the path of the bar when the latter is stationary, and means for rotating said mandrel independently of the shaft in which it is mounted, said means comprising a driving shaft centrally mounted in the hollow shaft, having a geared connection with the mandrel, and extending beyond the hollow shaft, substantially as described.

19. In a candy machine, a cutting mechanism comprising an upright hollow shaft having transverse disks or heads therein, means for rotating said shaft, a driving shaft centrally mounted in said hollow shaft and provided with independent driving means and with a pinion on its upper end, and a mandrel provided with a cutting disk at its upper end and removably fitting in eccentric bearings in the disks or heads, its lower end being grooved to form a pinion to mesh with the pinion of the driving shaft, whereby said cutting disk and mandrel may be readily removed from the hollow shaft, substantially as described.

20. In a machine of the character described, the combination, with mechanism for successively forming the individual confections, of a tempering conveyer interposed between said forming and wrapping mechanisms and acting to uniformly delay the delivery of the newly formed confections to the wrapping mechanism, whereby they are caused to assume a proper condition for wrapping before such delivery, substantially as described.

21. In a machine of the character described, the combination, with confection-forming mechanism and wrapping mechanism, of a tempering conveyer which receives the newly formed confections, and sizing rolls interposed between the tempering conveyer and wrapping mechanism to prevent the delivery to the wrapping mechanism of confections of excessive width, substantially as described.

22. In a candy machine, the combination, with confection-forming mechanism, of a tempering conveyer comprising an endless belt or the like, and pulleys for supporting and driving the same, said belt having laterally projecting fingers between which the confections are received, and supports or runways over which the fingers extend and along which the confections are carried by said fingers, substantially as described.

23. In a candy machine, the combination, with confection-forming mechanism, of a tempering conveyer comprising an endless belt or the like, and pulleys for supporting and driving the same, said belt having laterally projecting fingers between which the confections are received, and supports or runways over which the fingers extend and along which the confections are carried by said fingers, said supports or runways comprising parallel upper and lower members and curved connecting portions overlapping each other, whereby the confections are reversed in passing from one runway to another, substantially as described.

24. In a candy machine, the combination, with forming rolls intermittently rotating to feed forward a bar of candy, and a cutter for severing the part thus fed forward to form a confection, of an intermittently moving tempering conveyer adapted to receive the confections thus formed, and a wrapping mechanism for wrapping said confections after they are delivered thereto by the tempering conveyer, substantially as described.

25. In a candy machine, the combination, with forming rolls geared to rotate in unison, one of said rolls being provided with a ratchet wheel, of a tempering conveyer comprising an endless belt and supporting pulleys therefor, one of which is provided with a ratchet wheel, and a reciprocating slide provided with pawls for engaging and operating said ratchet wheels, substantially as described.

26. In a candy machine, the combination, with forming rolls and a ratchet wheel for actuating the same, of a tempering conveyer and a ratchet wheel for actuating said conveyer, a reciprocating slide having oppositely arranged pawls for alternately engaging said ratchet wheels, a second reciprocating slide having a cam slot engaged by the pawl bearing slide, said cam slot having an inclined actuating portion and a straight dwelling portion, whereby the forming rolls and tempering conveyer remain stationary during a period, and a cutter operating during the said stationary period, substantially as described.

27. In a candy machine, a tempering conveyer comprising an endless belt and means for actuating the same, a support or runway located adjacent to the belt, fingers secured to the belt and extending over the runway, and a hinged plate extending over the runway above said fingers, substantially as described.

28. In a candy machine, a tempering conveyer comprising an endless belt or the like, and means for actuating the same, a support or runway located adjacent to the belt, and fingers secured to the belt and extending over the runway, said fingers having lateral flanges adjacent to the edge of the runway nearest the belt, substantially as described.

29. In a candy machine, a tempering conveyer comprising an endless belt or the like, and means for actuating the same, a support or runway located adjacent to the belt and having a guard along its margin farthest from the belt, and fingers secured to the belt and extending over the runway, said fingers having lateral flanges adjacent to the edge of the runway nearest the belt, substantially as described.

30. In a candy machine, the combination, with a conveyer comprising an endless belt or the like provided with laterally projecting fingers, and a runway over which said fingers travel, of a second endless conveyer arranged at right angles thereto and provided with projections, and a guide above said second conveyer having supporting plates separated for the passage of the projections, and a guard plate above the same, between which plates the fingers pass, substantially as described.

31. In a candy machine, an endless conveyer for feeding forward the confections, in combination with sizing rolls rotating in horizontal planes on opposite sides of said conveyer, substantially as described.

32. In a candy machine, the combination, with two endless conveyers for feeding forward the confections, said conveyers having their adjacent pulleys superposed, and a runway arranged below the upper conveyer, of sizing rolls extending into the space between the two conveyers where they overlap, substantially as described.

33. In a candy machine, the combination, with wrapping mechanism, of conveying mechanism comprising an endless conveyer having projections for positively feeding forward the confections to the wrapper, a runway along which said confections are thus conveyed, and a cut-off acting in unison with the wrapping mechanism to control the passage of the confections along the runway, substantially as described.

34. In a candy machine, the combination, with wrapping mechanism, of conveying mechanism comprising an endless conveyer having projections to positively feed the confections, a runway along which the confections are thus conveyed, a reciprocating slide for actuating the wrapping mechanism, and a cut-off plate traveling across the runway, moving in unison with the slide, and recessed to permit the passage of the confections when stationary, substantially as described.

35. In a candy machine, the combination, with confection-forming and wrapping mechanism, of conveying mechanism for carrying the confections from the forming to the wrapping mechanism, said conveying mechanism being constructed and arranged to positively carry the confections and guide them by inclosing them against displacement throughout their travel, substantially as described.

36. In a candy machine, means for drawing, diminishing and feeding forward candy comprising a plurality of pairs of feeding and drawing rolls arranged to successively receive the candy, said pairs of rolls being of successively smaller diameter, width and pass, and of successively increasing peripheral velocity, in combination with a trough connecting said rolls and comprising side plates bearing against the lateral faces of the rolls and contracting or narrowing between the pairs of rolls, substantially as described.

37. In a candy machine, the combination, with a plurality of pairs of feeding and drawing rolls arranged to successively receive the candy, of housings in which said rolls are mounted, a trough connecting the rolls and comprising side plates passing through the housings and rolls, and screws mounted in the housings and bearing against the side plates to hold them against the lateral faces of the rolls, substantially as described.

38. In a candy machine, the combination, with a plurality of pairs of feeding and drawing rolls arranged to successively receive the candy, of housings in which said rolls are mounted, a trough connecting the rolls and comprising side plates passing between the housings and rolls, and screws mounted in the housings and bearing against the side plates to hold them against the lateral faces of the rolls, each of said side plates having one of said screws engaging the same to hold it against displacement, substantially as described.

39. In a machine of the character described, the combination, with a wrapping mechanism, of means for forming confections and feeding them to the wrapping mechanism, a paper-feeding and sheet-forming mechanism for feeding forward a web of paper, cutting the same into wrapper sheets and delivering the sheets to the wrapping mechanism; and means for independently starting and stopping said paper-feeding and sheet-forming mechanism, substantially as described.

In testimony whereof, I affix my signature in presence of two witnesses.

DENNIS T. IGOU.

Witnesses:
E. O. HAGAN,
IRVINE MILLER.